United States Patent
Fukui et al.

(10) Patent No.: US 11,421,122 B2
(45) Date of Patent: Aug. 23, 2022

(54) AQUEOUS INK, INK FOR INKJET RECORDING, PRINTED MATERIAL AND METHOD FOR PRODUCING PRINTED MATERIAL

(71) Applicant: DIC Corporation, Tokyo (JP)

(72) Inventors: Saki Fukui, Kitaadachi-gun (JP); Keigo Gouda, Kitaadachi-gun (JP); Masaki Hosaka, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 17/279,688

(22) PCT Filed: Oct. 3, 2019

(86) PCT No.: PCT/JP2019/039098
§ 371 (c)(1),
(2) Date: Mar. 25, 2021

(87) PCT Pub. No.: WO2020/080121
PCT Pub. Date: Apr. 23, 2020

(65) Prior Publication Data
US 2021/0395546 A1 Dec. 23, 2021

(30) Foreign Application Priority Data

Oct. 15, 2018 (JP) .............................. JP2018-194306

(51) Int. Cl.
*C09D 11/322* (2014.01)
*B41J 2/01* (2006.01)
*C09D 11/38* (2014.01)

(52) U.S. Cl.
CPC ............... *C09D 11/322* (2013.01); *B41J 2/01* (2013.01); *C09D 11/38* (2013.01)

(58) Field of Classification Search
CPC .. C08J 3/05; C08J 3/03; C09D 11/322; C09D 11/38; C09D 175/04; B41J 2/01
See application file for complete search history.

(56) References Cited

U.S. PATENT DOCUMENTS

| | | | | |
|---|---|---|---|---|
| 4,271,217 A | * | 6/1981 | Tanaka | D01F 6/70 427/155 |
| 2009/0264578 A1 | * | 10/2009 | Minaki | C08G 18/0866 524/502 |
| 2012/0029146 A1 | * | 2/2012 | Matsui | C08G 18/755 524/591 |
| 2017/0369725 A1 | * | 12/2017 | Mitsuyoshi | B41J 2/01 |
| 2019/0023927 A1 | * | 1/2019 | Hama | B41M 5/0023 |

FOREIGN PATENT DOCUMENTS

| JP | 2011-12226 A | 1/2011 |
|---|---|---|
| JP | 2013-253157 A | 12/2013 |
| JP | 2014-24945 A | 2/2014 |
| JP | 2018-62577 A | 4/2018 |

OTHER PUBLICATIONS

International Search Report dated Nov. 5, 2019, issued in counterpart International Application No. PCT/JP2019/039098 (2 pages).

* cited by examiner

*Primary Examiner* — John Zimmermann
(74) *Attorney, Agent, or Firm* — WHDA, LLP

(57) ABSTRACT

A problem to be solved by the invention is to provide an aqueous ink capable of forming a clear print image without causing deterioration in print quality due to uneven drying (mottling) of the ink even when continuous printing is performed for a long period of time or when printing is resumed after printing is suspended for several minutes to several hours. The invention relates to an aqueous ink containing: an acetylene-based surfactant (A); a nonionic surfactant (B) other than the acetylene-based surfactant (A); and an aqueous medium (C), in which the nonionic surfactant (B) contains a nonionic surfactant that satisfies at least one of the following three requirements: (i) having an HLB of less than 13.5, (ii) having a clouding point of 75° C. or lower, and (iii) having no clouding point.

10 Claims, 1 Drawing Sheet

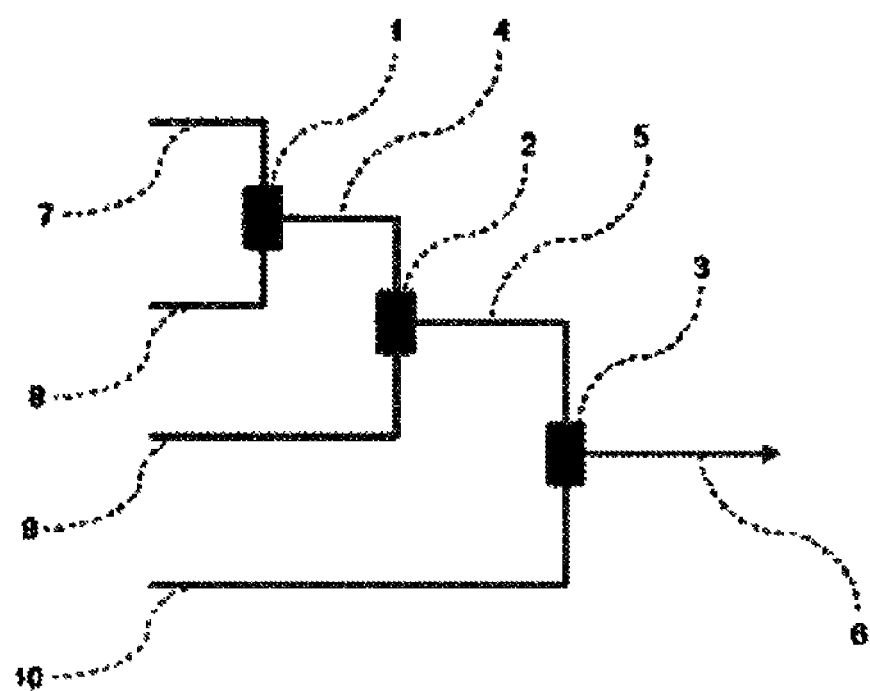

AQUEOUS INK, INK FOR INKJET RECORDING, PRINTED MATERIAL AND METHOD FOR PRODUCING PRINTED MATERIAL

TECHNICAL FIELD

The present invention relates to an aqueous ink that can be used in production of a printed material.

BACKGROUND ART

In the industrial field, a method of printing on a packaging material or an advertisement medium using an inkjet printer has been studied.

Examples of the packaging material and the like include a plastic film which is a non-absorbable recording medium that does not absorb a solvent in an ink, coated paper which is a poorly-absorbable recording medium that poorly absorbs the solvent in the ink, and a corrugated paperboard sheet or a corrugated carton in which a paperboard processed into a wavy shape is sandwiched and bonded between two paperboards formed of the coated paper and the like.

When printing is performed on the non-absorbable or poorly-absorbable recording medium by an inkjet recording method using an aqueous pigment ink, the ink dries and solidifies at a nozzle portion of an inkjet head over time, and as a result, a direction in which the ink is ejected is bent with respect to a direction in which the ink is supposed to be ejected, or an ejection failure such as ink being not ejected occurs in some cases.

As an ink capable of preventing drying and solidification at the nozzle portion over time, there has been known, for example, an ink composition for inkjet recording in which a pigment and an aqueous emulsion resin having a glass transition point of 16° C. or higher and an acid value of 10 mgKOH/g or more are blended so as to have a solid content of 15 wt % or more, and an amino alcohol is blended as a dispersion stabilizer (see, for example, PTL 1).

However, since the ink which is difficult to dry or the like at the nozzle portion is difficult to dry similarly on the non-absorbable or poorly-absorbable recording medium landing thereon, uneven drying (mottling) of the ink is likely to occur, and as a result, clearness of a printed material may be deteriorated.

CITATION LIST

Patent Literature

PTL 1: JP-A-2011-12226

SUMMARY OF INVENTION

Technical Problem

The invention solves the problems by providing an aqueous ink capable of forming a clear printed image without causing deterioration in print quality due to uneven drying (mottling) of the aqueous ink even when printing is performed on the non-absorbable or poorly-absorbable recording medium.

Solution to Problem

The invention has solved the problems by an aqueous ink containing: an acetylene-based surfactant (A); a nonionic surfactant (B) other than the acetylene-based surfactant (A); and an aqueous medium (C), in which the nonionic surfactant (B) contains a nonionic surfactant that satisfies at least one of the following three requirements: (i) having an HLB of less than 13.5, (ii) having a clouding point of 75° C. or lower, and (iii) having no clouding point.

Advantageous Effects of Invention

According to the aqueous ink of the invention, even when continuous printing is performed for a long period of time or when printing is resumed after printing is suspended for several minutes to several hours, ejection failure due to drying and solidification at a nozzle portion of an inkjet head is less likely to occur, and even when printing is performed on the non-absorbable or poorly-absorbable recording medium, deterioration in print quality due to uneven drying (mottling) of an aqueous ink is not caused, so that a clear printed image can be formed.

BRIEF DESCRIPTION OF DRAWINGS

FIG. 1 is a schematic view of a microreactor used in the invention.

DESCRIPTION OF EMBODIMENTS

An aqueous ink according to the invention contains: an acetylene-based surfactant (A); a nonionic surfactant (B) other than the acetylene-based surfactant (A); and an aqueous medium (C), in which the nonionic surfactant (B) contains a nonionic surfactant that satisfies at least one of the following three requirements: (i) having an HLB of less than 13.5, (ii) having a clouding point of 75° C. or lower, and (iii) having no clouding point.

In the invention, by using the specific acetylene-based surfactant (A) and the specific nonionic surfactant (B) in combination, it is possible to prevent deterioration in print quality due to uneven drying (mottling) of the aqueous ink even when printing is performed on the non-absorbable or poorly-absorbable recording medium.

The acetylene-based surfactant (A) exhibits an effect of reducing occurrence of the mottling. The acetylene-based surfactant (A) exhibits an effect of preventing occurrence of a streak on a printed material by causing the aqueous ink ejected from an ejection port of an inkjet head to satisfactorily wet-spread on a surface of the recording medium.

As the acetylene-based surfactant (A), a surfactant having an acetylene group can be used. For example, acetylene glycol, an oxyethylene adduct of acetylene glycol, or a mixture thereof can be used alone or in combination of two or more thereof. It can be used.

As the acetylene-based surfactant (A), for example, Surfynol 104E, Surfynol 104H, Surfynol 104A, Surfynol 104PA, Surfynol 104PG-50, Surfynol 104S, Surfynol 420, Surfynol 440, Surfynol 465, Surfynol 485, Surfynol SE, Surfynol SE-F, Surfynol PSA-336, Surfynol 61, Surfynol 82, Surfynol DF110D, Dynol 604, Dynol 607, Surfynol 2502, Surfynol DF37, Surfynol MD-20, Dynol 800, Dynol 810, and Dynol 360 (all manufactured by EVONIK) can be used.

As the acetylene-based surfactant (A), it is preferable to use an acetylene-based surfactant having an HLB in a range of 3 to 20, so as to prevent the acetylene-based surfactant (A) from being precipitated in the aqueous ink according to the invention. As the acetylene-based surfactant (A), it is more preferable to use an acetylene-based surfactant having an HLB in a range of 3 to 15, even more preferable to use an acetylene-based surfactant having an HLB in a range of 3 to 8, and particularly preferable to use an acetylene-based surfactant having an HLB in a range of 3 to 6, so as to impart good leveling properties to the aqueous ink according to the invention, to reduce the mottling, to easily wet-spread the aqueous ink according to the invention on the surface of the recording medium, and to prevent the occurrence of a streak on the printed material.

When the acetylene-based surfactant having an HLB of preferably 3 to 8, more preferably 3 to 6 is used as the acetylene-based surfactant (A), it is preferable to use the acetylene-based surfactant having an HLB of preferably 3 to 8, more preferably 3 to 6 in combination with an acetylene-based surfactant having an HLB of 10 to 20, so as to enhance solubility of the acetylene-based surfactant in an aqueous medium.

As the acetylene-based surfactant having an HLB of 3 to 8, for example, Surfynol 104E, Surfynol 104H, Surfynol 104A, Surfynol 104PA, Surfynol 104PG-50, Surfynol 104S, Surfynol 420, Surfynol 440, Surfynol SE, Surfynol SE-F, Surfynol 61, Surfynol 82, Surfynol DF110D, Dynol 604, Dynol 607, and Surfynol 2502 can be used.

Examples of the acetylene-based surfactant having an HLB of 3 to 6 include Surfynol 104E, Surfynol 104H, Surfynol 104A, Surfynol 104PA, Surfynol 104PG-50, Surfynol 104S, Surfynol 420, Surfynol SE, Surfynol SE-F, Surfynol 61, Surfynol 82, Surfynol DF110D, and Dynol 604.

As the acetylene-based surfactant having an HLB of 10 to 20, for example, Surfynol 465 can be used.

The content of the acetylene-based surfactant (A) is preferably in a range of 0.001 mass % to 4 mass %, more preferably in a range of 0.5 mass % to 4 mass %, and even more preferably in a range of 0.5 mass % to 3 mass %, with respect to a total amount of the aqueous ink. The aqueous ink containing the acetylene-based surfactant (A) in the above range can reduce mottling, easily wet-spreads on the surface of the recording medium, and can prevent the occurrence of a streak on the printed material.

Next, the nonionic surfactant (B) used in the invention will be described.

As the nonionic surfactant (B), a nonionic surfactant can be used that satisfies at least one of the following three requirements: (i) having an HLB of less than 13.5, (ii) having a clouding point of 75° C. or lower, and (iii) having no clouding point.

By using the nonionic surfactant (B), an aqueous ink capable of reducing mottling of a coated film can be obtained.

Here, an aqueous ink containing either the nonionic surfactant (B) or the acetylene-based surfactant (A) alone may cause deterioration in print quality due to uneven drying (mottling) of the aqueous ink, may be less likely to wet-spread on the surface of the recording medium and cause a streak on the printed material when printing is performed on the non-absorbable or poorly-absorbable recording medium.

On the other hand, in a case of the aqueous ink containing the above surfactants in combination as in the invention, it is possible to prevent the deterioration in print quality due to uneven drying (mottling) of the aqueous ink, it is likely to wet-spread the aqueous ink on the surface of the recording medium, and it is possible to prevent the occurrence of a streak on the printed material even when printing is performed on the non-absorbable or poorly-absorbable recording medium.

As the nonionic surfactant (B), for example, nonionic surfactants that satisfy at least one of the requirements (i) to (iii) can be used alone or in combination, and nonionic surfactants that satisfy two or more of the requirements (i) to (iii) can be used alone or in combination.

Among these, as the nonionic surfactant (B), it is preferable to use a nonionic surfactant having an HLB of 12.5 or less and having no clouding point so as to further reduce the mottling.

Examples of the nonionic surfactant (B) include a polyoxyethylene alkyl ether, a polyoxyalkylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene sorbitol fatty acid ester, a glycerin fatty acid ester, a polyoxyethylene glycerin fatty acid ester, a polyglycerin fatty acid ester, a sucrose fatty acid ester, a polyoxyethylene alkylamine, a polyoxyethylene fatty acid amide, a fatty acid alkylolamide, an alkyl alkanolamide, acetylene glycol, an oxyethylene adduct of acetylene glycol, and a polyethylene glycol-polypropylene glycol block copolymer.

Among these, as the nonionic surfactant (B), it is preferable to use a polyoxyalkylene alkyl ether.

Examples of the polyoxyethylene alkyl ether include Emulgen 102KG, Emulgen 103, Emulgen 104P, Emulgen 105, Emulgen 106, Emulgen 108, Emulgen 210, Emulgen 306P, Emulgen 404, Emulgen 408, Emulgen 409P, Emulgen 705, Emulgen 707, Emulgen 709, Emulgen 1108, Emulgen LS-106, Emulgen LS-110, Emulgen MS-110, Emulgen A-60, Emulgen B-66 (all manufactured by Kao Corporation), Naroacty CL-40, Naroacty CL-50, Naroacty CL-70, Naroacty CL-85, Naroacty CL-95, Naroacty CL-100, Naroacty ID-40, Naroacty ID-60, Naroacty ID-70, Sannonic DE-70, Sannonic FN-80, Sannonic FN-100, Sannonic SS-30, Sannonic SS-50, Sannonic SS-70, Sannonic SS-90, Emulmin FL-80, Emulmin FL-100, Emulmin HL-80, Emulmin HL-100, Emulmin LS-80, Emulmin NL-70, Emulmin NL-80, Emulmin 40, Emulmin 50, Emulmin 70, Sedoran FF-180, Sedoran FF-200, Sedoran FF-210, Sedoran FF-220, Sedoran SF-506, and Sannonic TN-1265 (all manufactured by Sanyo Chemical Industries, Ltd.).

Among the surfactants, examples of the surfactant that satisfies (i) having an HLB of less than 13.5 include Emulmin 110 and Naroacty CL-140, and examples of the surfactant that satisfies (ii) having a clouding point of 75° C. or lower include Emulgen 1180, Emulmin FL-80, Emulmin FL-100, Emulmin HL-80, Emulmin HL-100, Sannonic FN-80, and Sannonic FN-100.

Examples of the surfactant that satisfies the above (i) and (ii) include Emulgen 108, Emulgen 409P, Emulgen 707, Emulgen 709, Emulgen LS-106, Emulgen LS-110, Emulgen MS-110, Emulgen A-60, Emulgen B-66, Emulmin LS-80, Emulmin NL-70, Emulmin NL-80, Emulmin 40, Emulmin 50, Emulmin 70, Naroacty CL-40, Naroacty CL-50, Naroacty CL-70, Naroacty CL-85, Naroacty CL-95, Naroacty CL-100, Naroacty ID-40, Naroacty ID-60, Naroacty ID-70, Sannonic DE-70, Sannonic SS-30, Sannonic SS-50, Sannonic SS-70, and Sannonic SS-90.

Examples of the surfactant that satisfies the above (i) and (iii) include Emulgen 102KG, Emulgen 103, Emulgen 104P, Emulgen 105, Emulgen 106, Emulgen 108, Emulgen 210, Emulgen 306P, Emulgen 404, Emulgen 408, Emulgen 409P, and Emulgen 705.

As the nonionic surfactant (B), a nonionic surfactant having an HLB of less than 13.5 is used, a nonionic surfactant having an HLB of less than 12.5 is preferably used, and a nonionic surfactant having an HLB of less than 10 is more preferably used, so as to obtain an aqueous ink having excellent leveling properties on the surface of the recording medium and capable of preventing the occurrence of the mottling.

As the nonionic surfactant (B), it is preferable to use a nonionic surfactant having an HLB of 4 or more, and more preferable to use a nonionic surfactant having an HLB of 6 or more so as to ensure solubility in the aqueous ink.

As the nonionic surfactant (B), a nonionic surfactant having a clouding point of 75° C. or lower or a nonionic surfactant having no clouding point is used, and a nonionic surfactant having a clouding point of 60° C. or lower or a nonionic surfactant having no clouding point is preferably used. By using the nonionic surfactant (B) in the above range, it is possible to significantly reduce the mottling of an ink-coated film.

The nonionic surfactant (B) is preferably used, with respect to the total amount of the aqueous ink according to the invention, in a range of 0.001 mass % to 5 mass %, more preferably in a range of 0.05 mass % to 2 mass %, and particularly preferably in a range of 0.05 mass % to 0.5 mass % so as to obtain an aqueous ink having excellent leveling properties on the surface of the recording medium and capable of preventing the occurrence of the mottling. The aqueous ink containing the nonionic surfactant (B) in the above range has excellent properties (redispersibility) in which, even when the ink at the ink ejection port is solidified due to evaporation of a solvent by drying, the solidified matter can be easily dispersed in the aqueous ink due to the aqueous ink flowing through the ejection port again. The aqueous ink containing the nonionic surfactant (B) in the above range is excellent in initial ejection state (ejection characteristics) when printing is resumed after printing is suspended for several minutes to several hours.

A total mass of the acetylene-based surfactant (A) and the nonionic surfactant (B) is preferably, with respect to the total amount of the aqueous ink according to the invention, in a range of 0.5 mass % to 5 mass %, and particularly preferably in a range of 1 mass % to 4 mass %, so as to further reduce the mottling and provide good ink redispersibility and ejection characteristics.

A mass ratio of the acetylene-based surfactant (A) to the nonionic surfactant (B) [acetylene-based surfactant (A)/nonionic surfactant (B)] is preferably in a range of 3 to 20, and more preferably in a range of 5 to 20, so as to further reduce the mottling and provide good ink redispersibility and ejection characteristics.

As the aqueous medium (C) contained in the aqueous ink according to the invention, water may be used alone, or a mixed solvent of water and an organic solvent described later may be used.

Specific examples of the water include ultrapure water and pure water such as ion exchange water, ultrafiltration water, reverse osmosis water, and distilled water.

The aqueous medium (C) is preferably used, with respect to the total amount of the aqueous ink, in a range of 20 mass % to 80 mass %, and particularly preferably used in a range of 40 mass % to 70 mass %, so as to obtain an aqueous ink which is excellent in settability, has high ejection stability required when ejected by an inkjet method, and can produce a clear printed material.

As the aqueous ink according to the invention, one which contains, in addition to the acetylene-based surfactant (A), the nonionic surfactant (B), and the aqueous medium (C), a binder resin, a coloring material such as a pigment, a pigment dispersion resin, and an organic solvent, as necessary, can be used.

The aqueous ink containing the binder resin has excellent properties (redispersibility) in which, even when the aqueous ink at the ink ejection port is solidified due to evaporation of a solvent by drying, the solidified matter can be easily dispersed in the aqueous ink due to the aqueous ink flowing through the ejection port again. As a result, in a case where the aqueous ink is ejected from the inkjet head, even when ejection is stopped for a certain period of time and then started again, flight deflection of the ejected liquid droplet or blocking of the ejection port is less likely to occur, and it is possible to effectively prevent the occurrence of a streak on the printed material.

As the binder resin, for example, polyvinyl alcohol, gelatin, polyethylene oxide, polyvinylpyrrolidone, an acrylic resin, a urethane resin, dextran, dextrin, carrageenan (κ, ι, λ, and the like), agar, pullulan, water-soluble polyvinyl butyral, hydroxyethyl cellulose, and carboxymethyl cellulose can be used alone or in combination of several kinds thereof. Among these, it is preferable to use an acrylic resin as the binder resin.

As the acrylic resin, for example, one formed of a polymer obtained by radical polymerization of a vinyl monomer or the like can be used.

As the vinyl monomer, for example, a (meth)acrylate-based monomer such as (meth)acrylic acid and an alkali metal salt thereof, methyl (meth)acrylate, ethyl (meth)acrylate, butyl (meth)acrylate, 2-ethylhexyl (meth)acrylate, benzyl (meth)acrylate, and cyclohexyl (meth)acrylate; an acrylic monomer having an amide group such as acrylamide and N,N-dimethyl (meth)acrylamide; an acrylic monomer such as (meth)acrylonitrile, 2-dimethylaminoethyl (meth)acrylate, and glycidyl (meth)acrylate; an aromatic vinyl compound such as styrene, α-methylstyrene, p-tert-butylstyrene, vinyl naphthalene, and vinyl anthracene; a vinyl sulfonate compound such as vinyl sulfonate and styrene sulfonate; a vinylpyridine compound such as 2-vinylpyridine, 4-vinylpyridine, and naphthylvinylpyridine; and a monomer having an aromatic group such as vinyl triethoxysilane, vinyl trimethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, and styrene or benzyl (meth)acrylate can be used.

As the acrylic resin, it is preferable to use an acrylic resin which is a polymer of acrylic acid or methacrylic acid and styrene so as to impart good redispersibility and mottling prevention effect to the aqueous ink according to the invention. In order to obtain an aqueous ink having more excellent redispersibility and mottling prevention effect, it is particularly preferable to use the acrylic resin as the binder resin and use the acrylic resin in combination with the acetylene-based surfactant (A) and the nonionic surfactant (B).

Examples of the acrylic resin include: JONCRYL PDX-7182, PDX-7356, PDX-7615, PDX-7696, PDX-7700, and PDX-7780 which are manufactured by BASF Corporation; VONCOAT CM8430 which is manufactured by DIC Corporation; EMUPOLY SG-8304, EMUPOLY SG-8305, and EMUPOLY DL-31 which are manufactured by Gifu shellac Manufacturing Co., Ltd.; and HIROS-X X-436, TE-1102, KE-1060, KE-1062, and VL-1147 which are manufactured by Seiko PMC Corporation.

As the acrylic resin, an acrylic resin can be used that imparts good redispersibility to the aqueous ink according to the invention, reduces mottling of an ink-coated film, and is excellent in dispersion stability in the aqueous medium (C). The acrylic monomer is preferably used in a range of 0.5 mass % or more and 10 mass % or less, more preferably in a range of 0.5 mass % to 8 mass %, and particularly preferably in a range of 1.5 mass % to 5 mass %, with respect to the total amount of the monomers used in production of the acrylic resin, so as to impart good redispersibility to the aqueous ink and further improve dispersion stability of an aqueous ink component in the aqueous medium (C).

In addition, the acrylic resin may contain a component whose molecular weight is difficult to measure and which is insoluble in tetrahydrofuran (THF) which is a developing solvent during molecular weight measurement by gel permeation chromatography. In order to further improve adhesion of the aqueous ink to a plastic base material, a metal base material, hydrophobic coated paper, art paper, or the like which is the non-absorbable or poorly-absorbable recording medium, the content of the THF-insoluble component at 25° C. is preferably less than 20 mass %, and more preferably less than 5 mass %, and most preferably the THF-insoluble component is not contained.

As the acrylic resin, it is preferable to use an acrylic resin dissolvable in THF and having a number average molecular weight of 10,000 to 100,000, and more preferable to use an acrylic resin dissolvable in THF and having a number average molecular weight of 20,000 to 100,000. As the acrylic resin, it is preferable to use an acrylic resin having a weight average molecular weight of 30,000 to 1,000,000, and more preferable to use an acrylic resin having a weight average molecular weight of 50,000 to 1,000,000.

As the binder resin, for example, a polyolefin can also be used.

As the polyolefin, a polymer or copolymer of monomers containing an olefin-based monomer as a main component is used. As the olefin-based monomer, for example, an α-olefin such as ethylene, propylene, butene, hexene, methylbutene, methylpentene, and methylhexene, and a cyclic olefin such as norbonene can be used. As the polyolefin, an oxidized polyolefin can also be used.

As the oxidized polyolefin, for example, an oxidized polyolefin obtained by introducing an oxygen atom into a molecule of a polyolefin by thermal decomposition or chemical decomposition using an acid or alkaline component can be used. The oxygen atom constitutes, for example, a carboxyl group having polarity.

As the polyolefin, it is preferable to use a polyolefin having a melting point of 90° C. or higher and 200° C. or lower. When a polyolefin having a melting point of 120° C. or higher and lower than 160° C. is used, good settability without peeling-off of the aqueous ink on the surface of the recording medium and excellent abrasion resistance can be imparted even when printed materials are superimposed immediately after printing. The melting point of the polyolefin refers to a value measured by a melting point measuring device in accordance with JIS K0064.

As described above, the polyolefin is preferably present in a state of being dissolved or dispersed in a solvent such as the aqueous medium (C), and is more preferably in a state of an emulsion dispersed in a solvent such as the aqueous medium (C).

In this case, polyolefin particles formed from the polyolefin preferably have an average particle size of 10 nm to 200 nm, and more preferably 30 nm to 150 nm, so as to achieve both good ejection stability of the aqueous ink and good settability after printing when the printing is performed by, for example, an inkjet recording method. The average particle size of the polyolefin (A) is a value measured by a dynamic light scattering method using a Microtrac UPA particle size distribution analyzer manufactured by Nikkiso Co., Ltd.

The binder resin is preferably used in a range of 0.5 mass % to 8 mass %, and more preferably in a range of 1.5 mass % to 5 mass %, with respect to a total amount of the aqueous ink, so as to prevent the occurrence of a streak, improve a printing density and the abrasion resistance of the printed material, reduce the mottling, and impart good gloss. In the aqueous ink containing the binder resin (A) in the above range, the binder resin (A) is crosslinked through a heating step after printing to form a strong coating film, and thus it is possible to further improve the abrasion resistance of the printed material. It is possible to impart good water resistance which prevents peeling-off of the aqueous ink on the surface of the recording medium even when water is dropped on the printed material or even when the printed material is rubbed with a cloth or the like containing water.

In the aqueous ink according to the invention, a compound having a urea bond can be used in combination with the binder resin. When the compound having a urea bond and the binder resin are used in combination, it is possible to impart good settability and excellent abrasion resistance to the printed material.

As the compound having a urea bond, urea or a urea derivative can be used.

As the urea derivative, for example, ethyleneurea, propyleneurea, diethylurea, thiourea, N, N-dimethylurea, hydroxyethylurea, hydroxybutylurea, ethylenethiourea, and diethylthiourea can be used alone or in combination of two or more thereof.

Among these, as the compound having a urea bond, it is particularly preferable to use urea, ethyleneurea, or 2-hydroxyethylurea so as to obtain a printed material having more excellent settability.

The content of the compound having a urea bond is preferably 1 mass % to 20 mass %, more preferably 2 mass % to 15 mass %, and even more preferably 3 mass % to 10 mass %, with respect to the total amount of the aqueous ink, so as to obtain ejection stability required when the aqueous ink according to the invention is ejected by an inkjet recording method and a printed material excellent in settability.

When the binder resin and the compound having a urea bond are used, the mass ratio of the binder resin to the compound having a urea bond (binder resin/compound having urea bond) is preferably 1/6 to 6/1, and more preferably 1/5 to 1/1 so as to improve the settability of the printed material.

Since the urea and the urea derivative have a high moisturizing function and function as a wetting agent, drying and solidification of the aqueous ink at an ink ejection port of an aqueous inkjet head can be prevented, and excellent ejection stability can be ensured. As a result, even when a distance from a surface (x) of an inkjet head having an ink ejection port to a position (y) at which a perpendicular line of the surface (x) intersects with a recording medium is 1 mm or more, and preferably 2 mm or more, as described later, there is an effect of reducing the occurrence of a streak on the printed material.

On the other hand, since the urea and the urea derivative easily release water when heated, it is preferable to perform heat drying after printing on the non-absorbable or poorly-absorbable recording medium with the aqueous ink according to the invention, so as to obtain a printed material having more excellent settability.

As the organic solvent that can be used in the aqueous ink, for example, ketones such as acetone, methyl ethyl ketone, methyl butyl ketone, and methyl isobutyl ketone; alcohols such as methanol, ethanol, 2-propanol, 2-methyl-1-propanol, 1-butanol, and 2-methoxyethanol; ethers such as tetrahydrofuran, 1,4-dioxane, and 1,2-dimethoxyethane; glycols such as dimethylformamide, N-methylpyrrolidone, ethylene glycol, diethylene glycol, triethylene glycol, tetraethylene glycol, propylene glycol, polyethylene glycol, and polypropylene glycol; diols such as butanediol, pentanediol, and hexanediol and diols of the same type; glycol esters such as propylene laurate glycol; glycol ethers such as cellosolve including diethylene glycol monoethyl, diethylene glycol monobutyl ether, diethylene glycol monohexyl ether, propylene glycol ether, dipropylene glycol ether, and triethylene glycol ether; alcohols such as methanol, ethanol, isopropyl alcohol, 1-propanol, 2-propanol, butyl alcohols such as 1-butanol and 2-butanol, pentyl alcohol and alcohols of the same type; sulfolane; lactones such as γ-butyrolactone; and lactams such as N-(2-hydroxyethyl)pyrrolidone can be used alone or in combination of two or more thereof.

In addition, as the organic solvent, in addition to those described above, a water-soluble organic solvent having a boiling point of 100° C. or higher and 200° C. or lower and a vapor pressure at 20° C. of 0.5 hPa or more can be used. Examples of the water-soluble organic solvent include 3-methoxy-1-butanol, 3-methyl-3-methoxy-1-butanol, 3-methoxy-3-methyl-1-butyl acetate, ethylene glycol monomethyl ether, ethylene glycol monoethyl ether, ethylene glycol monopropyl ether, ethylene glycol monobutyl ether, ethylene glycol monoisobutyl ether, ethylene glycol t-butyl ether, propylene glycol monomethyl ether, propylene glycol monoethyl ether, propylene glycol monopropyl ether, propylene glycol monomethyl ether acetate, diethylene glycol dimethyl ether, diethylene glycol methylethyl ether, diethylene glycol diethyl ether, dipropylene glycol dimethyl ether, 4-methoxy-4-methyl-2-pentanone, and ethyl lactate. These can be used alone or in combination of two or more thereof.

As the organic solvent that can be used in combination with the aqueous medium (C), it is preferable to use propylene glycol (f1) in combination with one or more organic solvents (f2) selected from the group consisting of glycerin, a glycerin derivative, diglycerin, and a diglycerin derivative, so as to achieve both the effect of reducing the mottling of the ink-coated film and the effect of preventing the drying and solidification of the aqueous ink at the ink ejection port.

As the organic solvent (f2), for example, glycerin, diglycerin, polyglycerin, a diglycerin fatty acid ester, a polyoxypropylene (n) polyglyceryl ether represented by a general formula (1), and a polyoxyethylene (n) polyglyceryl ether represented by a general formula (2) can be used alone or in combination of two or more thereof.

Among these, as the organic solvent (f2), it is particularly preferable to use glycerin and polyoxypropylene (n) polyglyceryl ether wherein n=8 to 15 so as to obtain excellent settability of the printed material and to prevent drying and solidification of the aqueous ink at the ink ejection port.

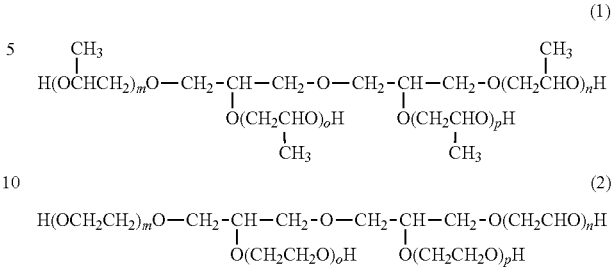

[Chem. 1]

$$H(OCHCH_2)_mO-CH_2-CH-CH_2-O-CH_2-CH-CH_2-O(CH_2CHO)_nH \quad (1)$$
with $CH_3$ groups and $O(CH_2CHO)_oH$, $O(CH_2CHO)_pH$ substituents (each with $CH_3$)

$$H(OCH_2CH_2)_mO-CH_2-CH-CH_2-O-CH_2-CH-CH_2-O(CH_2CHO)_nH \quad (2)$$
with $O(CH_2CH_2O)_oH$ and $O(CH_2CH_2O)_pH$ substituents In the general formula (1) and the general formula (2), m, n, o, and p each independently represent an integer of 1 to 10.

The organic solvent (F) is preferably used in a range of 1 mass % to 30 mass %, and particularly preferably used in a range of 5 mass % to 25 mass %, with respect to the total amount of the aqueous ink, so as to obtain excellent settability of the printed material and the effect of preventing drying and solidification of the aqueous ink at the ink ejection port.

As for the water-soluble organic solvent (f1), the propylene glycol (f2), and the organic solvent (f3) used, the mass ratio of the water-soluble organic solvent (f1) to the propylene glycol (f2) [water-soluble solvent (f1)/propylene glycol (f2)] is preferably in a range of 1/25 to 1/1, and particularly preferably in a range of 1/20 to 1/1, so as to obtain excellent settability of the printed material and the effect of preventing drying and solidification of the aqueous ink at the ink ejection port.

In addition, as for the water-soluble organic solvent (f1), the propylene glycol (f2), and the organic solvent (f3) used, the mass ratio of the propylene glycol (f2) to the organic solvent (f3) [propylene glycol (f2)/organic solvent (f3)] is preferably in a range of 1/4 to 8/1, and particularly preferably in a range of 1/2 to 5/1, so as to obtain excellent settability in the printed material and the effect of preventing drying and solidification of the aqueous ink at the ink ejection port.

As the coloring material that can be used in the aqueous ink according to the invention, known and commonly used pigments, dyes, and the like can be used. Among these, as the coloring material, it is preferable to use a pigment so as to produce a printed material excellent in weather resistance and the like. As the coloring material, a coloring agent in which the pigment is coated with a resin can also be used.

The pigment is not particularly limited, and an organic pigment or an inorganic pigment generally used in an aqueous gravure ink or an aqueous ink for inkjet recording can be used.

In addition, as the pigment, either an unacidified pigment or an acidified pigment can be used.

As the inorganic pigment, for example, iron oxide, and carbon black produced by a method such as a contact method, a furnace method, or a thermal method can be used.

As the organic pigment, for example, azo pigments (including an azo lake, an insoluble azo pigment, a condensed azo pigment, and a chelate azo pigment), polycyclic pigments (for example, a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment), lake pigments (for example, a basic dye type chelate, and an acidic dye type chelate), nitro pigments, nitroso pigments, and aniline black can be used.

Among the above pigments, as carbon black that can be used in a black ink, No. 2300, No. 2200B, No. 900, No. 960, No. 980, No. 33, No. 40, No. 45, No. 45L, No. 52, HCF88, MA7, MA8, MA100, and the like which are manufactured by Mitsubishi Chemical Corporation, Raven 5750, Raven 5250, Raven 5000, Raven 3500, Raven 1255, Raven 700, and the like which are manufactured by Columbia Corporation, Regal 400R, Regal 330R, Regal 660R, Mogul L, Mogul 700, Monarch 800, Monarch 880, Monarch 900, Monarch 1000, Monarch 1100, Monarch 1300, Monarch 1400, and the like which are manufactured by Cabot Corporation, Color Black FW1, Color Black FW2, Color Black FW2V, Color Black FW18, Color Black FW200, Color Black S150, Color Black S160, Color Black S170, Printex 35, Printex U, Printex V, Printex 1400U, Special Black 6, Special Black 5, Special Black 4, Special Black 4A, NIPEX 150, NIPEX 160, NIPEX 170, NIPEX 180, and the like which are manufactured by Degussa Corporation can be used.

In addition, specific examples of the pigment that can be used in a yellow ink include C. I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, and 185. Further, specific examples of the pigment that can be used in a magenta ink include C. I. Pigment Red 5, 7, 12, 48 (Ca), 48 (Mn), 57 (Ca), 57:1, 112, 122, 123, 146, 176, 184, 185, 202, 209, 269, 282, and C. I. Pigment Violet 19. Further, specific examples of the pigment that can be used in a cyan ink include C. I. Pigment Blue 1, 2, 3, 15, 15:3, 15:4, 16, 22, 60, 63, and 66.

Further, specific examples of the pigment that can be used in a white ink include sulfates and carbonates of an alkali earth metal, silicas such as a fine powder of silicic acid, and a synthetic silicate, calcium silicate, alumina, hydrated alumina, titanium oxide, zinc oxide, talc, and clay. These may be subjected to a surface treatment.

In order for the pigment to be stably present in the aqueous ink, it is preferable to take a method to disperse the pigment well in the aqueous medium (C).

Examples of the Method Include (i) a method of dispersing a pigment together with a pigment dispersing agent in the aqueous medium (C) by a dispersing method described later, and (ii) a method of dispersing and/or dissolving in the aqueous medium (C) a self-dispersible pigment in which a dispersibility-imparting group (a hydrophilic functional group and/or a salt thereof) is directly bonded to a surface of a pigment or indirectly bonded to the surface of the pigment via an alkyl group, an alkyl ether group, an aryl group, or the like.

As the self-dispersible pigment, for example, a pigment which has been subjected to a physical treatment or a chemical treatment and to the surface of which a dispersibility-imparting group or an active species having a dispersibility-imparting group is bonded (grafted) can be used. The self-dispersible pigment can be produced by, for example, a vacuum plasma treatment, an oxidation treatment with hypohalous acid and/or a hypohalous acid salt, an oxidation treatment with ozone, a wet oxidation method in which a pigment surface is oxidized by an oxidizing agent in water, or a method in which a carboxyl group is bonded via a phenyl group by bonding a p-aminobenzoic acid to a pigment surface.

Since the aqueous ink containing the self-dispersible pigment does not need to contain the pigment dispersing agent, foaming or the like caused by the pigment dispersing agent hardly occurs, and it is easy to prepare an aqueous ink having excellent ejection stability. The aqueous ink containing the self-dispersible pigment is easy to handle, and a significant increase in viscosity caused by the pigment dispersing agent is prevented, so that the aqueous ink can contain a larger amount of pigment, and can be used for production of a printed material having a high printing density.

As the self-dispersible pigment, a commercially available product may be used, and examples of such a commercially available product include Microjet CW-1 (trade name; manufactured by Orient Chemical Industries Co., Ltd.), CAB-O-JET 200, and CAB-O-JET 300 (trade names; manufactured by Cabot Corporation).

In the invention, when a composition of the aqueous ink is excessively changed so as to prevent the occurrence of a streak, there may be a tendency that the printing density and the abrasion resistance of the printed material are slightly lowered. The coloring material is preferably used in a range of 1 mass % to 20 mass %, and more preferably in a range of 2 mass % to 10 mass %, with respect to the total amount of the aqueous ink, so as to prevent the occurrence of a streak, to maintain excellent dispersion stability of the coloring material, and to improve the printing density and abrasion resistance of the printed material.

(Pigment Dispersing Agent)

The pigment dispersing agent can be suitably used when a pigment is used as the coloring material.

As the pigment dispersing agent, for example, polyvinyl alcohols, polyvinylpyrrodones, acrylic resins such as an acrylic acid-acrylic acid ester copolymer; styrene-acrylic resins such as a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer; aqueous resins such as a styrene-maleic acid copolymer, a styrene-maleic anhydride copolymer, and a vinylnaphthalene-acrylic acid copolymer; and salts of the aqueous resins. As the pigment dispersing agent, product AJISPER PB series manufactured by Ajinomoto Fine-Techno Co., Inc., Disperbyk series manufactured by BYK-Chemie Japan K.K., EFKA series manufactured by BASF Corporation, SOLSPERSE series manufactured by Lubrizol Japan Ltd., TEGO series manufactured by Evonik Industries, and the like can be used.

As the pigment dispersing agent, it is preferable to use a polymer (G) described later so as to significantly reduce coarse particles, and as a result, to impart good ejection stability required when ejecting the aqueous ink according to the invention by an inkjet method.

As the polymer (G), polymers having an anionic group can be used, and among these, it is preferable to use a polymer having a solubility of 0.1 g/100 ml or less in water and a number average molecular weight in a range of 1,000 to 6,000, which can form fine particles in water when a neutralization ratio of the anionic group with a basic compound is 100%.

The solubility of the polymer (G) in water is defined as follows. That is, 0.5 g of a polymer (E) whose particle size is adjusted to a range of 250 μm to 90 μm using sieves having openings of 250 μm and 90 μm is enclosed in a bag obtained by processing a 400-mesh metal mesh, immersed in 50 ml of water, and gently stirred and left at a temperature of 25° C. for 24 hours. After immersion for 24 hours, the 400-mesh metal mesh in which the polymer (E) is enclosed is dried for 2 hours in a dryer set to 110° C. A change in weight of the 400-mesh metal mesh in which the polymer (E) is enclosed before and after immersion in water is measured, and the solubility is calculated according to the following Equation.

Solubility (g/100 ml)=(400-mesh metal mesh in which polymer is enclosed before immersion (g)−400-mesh metal mesh in which polymer is enclosed after immersion (g))×2    [Math. 1]

In addition, in the invention, whether fine particles are formed in water when the neutralization ratio of the anionic group with the basic compound is 100% is determined as follows.
(1) An acid value of the polymer (G) is measured in advance by an acid value measuring method based on a JIS test method K0070-1992. Specifically, 0.5 g of the polymer (G) is dissolved in tetrahydrofuran, and the acid value is determined by titration with a 0.1 M potassium hydroxide alcohol solution using phenolphthalein as an indicator.
(2) After adding 1 g of the polymer (G) to 50 ml of water, a 0.1 mol/L potassium hydroxide aqueous solution, in an amount sufficient to neutralize the obtained acid value by 100%, is added to 100% neutralize the obtained solution.
(3) The 100% neutralized solution is irradiated with ultrasonic waves at a temperature of 25° C. for 2 hours in an ultrasonic cleaner (ultrasonic cleaner US-102 manufactured by SND Co., Ltd., 38 kHz self-excited oscillation), and then left to stand at a room temperature for 24 hours.

After leaving for 24 hours, a sample liquid obtained by sampling a liquid at a depth of 2 cm from a liquid surface is checked whether fine particles are present by determining whether light scattering information due to formation of the fine particles is obtained using a dynamic light scattering type particle size distribution measuring device (dynamic light scattering type particle size measuring device "Micro track particle size distribution analyzer UPA-ST 150" manufactured by Nikkiso Co., Ltd.).

In order to further improve the stability of the fine particles formed by the polymer (G) used in the invention in water, the particle size of the fine particles is preferably in a range of 5 nm to 1000 nm, more preferably in a range of 7 nm to 700 nm, and most preferably in a range of 10 nm to 500 nm. The narrower the particle size distribution of the fine particles, the better the dispersion stability. However, even when the particle size distribution is wide, it is possible to obtain an aqueous ink having more excellent dispersion stability than before. The particle size and the particle size distribution are measured using the dynamic light scattering type particle size distribution measuring device (dynamic light scattering type particle size measuring device "Micro track particle size distribution analyzer UPA-ST 150" manufactured by Nikkiso Co., Ltd.) in the same manner as in the measuring method for the fine particles.

The neutralization ratio of the polymer (G) used in the invention is determined according to the following Equation.

Neutralization ratio (%)={(mass (g) of basic compound×56×1000)/(acid value (mgKOH/g) of polymer (E)×equivalent of basic compound× mass (g) of polymer (E))}×100    [Math. 2]

The acid value of the polymer (G) is measured based on the JIS test method K0070-1992. Specifically, 0.5 g of a sample is dissolved in tetrahydrofuran, and the acid value is determined by titration with a 0.1 M potassium hydroxide alcohol solution using phenolphthalein as an indicator.

The number average molecular weight of the polymer (G) used is preferably in a range of 1,000 to 6,000, more preferably in a range of 1,300 to 5,000, and even more preferably in a range of 1,500 to 4,500, so as to effectively prevent aggregation or the like of the coloring material such as a pigment contained in the aqueous medium (C) and to obtain an aqueous ink having good dispersion stability of the coloring material (D).

The number average molecular weight is a value in terms of polystyrene measured by gel permeation chromatography (GPC), and specifically, a value measured under the following conditions.

(Method for Measuring Number Average Molecular Weight (Mn))

Measurement is performed by gel permeation chromatography (GPC) under the following conditions.
Measurement device: high speed GPC device ("HLC-8220GPC" manufactured by Tosoh Corporation)
Column: the following columns manufactured by Tosoh Corporation are connected in series and used.
"TSK gel G5000" (7.8 mm I.D.×30 cm)×1
"TSK gel G4000" (7.8 mm I.D.×30 cm)×1
"TSK gel G3000" (7.8 mm I.D.×30 cm)×1
"TSK gel G2000" (7.8 mm I.D.×30 cm)×1
Detector: RI (differential refractometer)
Column temperature: 40° C.
Eluent: tetrahydrofuran
Flow rate: 1.0 mL/min
Injection amount: 100 μL (tetrahydrofuran solution having a sample concentration of 0.4 mass %)
Standard sample: a calibration curve is prepared using the following standard polystyrene.
(Standard Polystyrene)
"TSK gel standard polystyrene A-500" manufactured by Tosoh Corporation
"TSK gel standard polystyrene A-1000" manufactured by Tosoh Corporation
"TSK gel standard polystyrene A-2500" manufactured by Tosoh Corporation
"TSK gel standard polystyrene A-5000" manufactured by Tosoh Corporation
"TSK gel standard polystyrene F-1" manufactured by Tosoh Corporation
"TSK gel standard polystyrene F-2" manufactured by Tosoh Corporation
"TSK gel standard polystyrene F-4" manufactured by Tosoh Corporation
"TSK gel standard polystyrene F-10" manufactured by Tosoh Corporation
"TSK gel standard polystyrene F-20" manufactured by Tosoh Corporation
"TSK gel standard polystyrene F-40" manufactured by Tosch Corporation
"TSK gel standard polystyrene F-80" manufactured by Tosoh Corporation
"TSK gel standard polystyrene F-128" manufactured by Tosoh Corporation
"TSK gel standard polystyrene F-288" manufactured by Tosoh Corporation
"TSK gel standard polystyrene F-550" manufactured by Tosoh Corporation Regarding the polymer (G) used, surface tension of the aqueous ink containing the polymer (G) is preferably 30 dyn/cm or more, more preferably 40 dyn/cm or more, and particularly preferably 65 dyn/cm to 75 dyn/cm which is close to that of water. The surface tension is a value measured for a polymer solution obtained by adding 1 g of the polymer (G) to water, then adding a 0.1 mol/L potassium hydroxide aqueous solution, in an amount sufficient to neutralize the obtained acid value by 100%, to 100% neutralize the obtained solution.

As the polymer (G), a polymer which is insoluble or poorly soluble in water in an unneutralized state and forms the fine particles in a 100% neutralized state can be used, and the polymer (G) is not particularly limited as long as the polymer (G) has a hydrophobic group in one molecule in addition to an anionic group which is a hydrophilic group.

Examples of such a polymer include a block polymer that has a polymer block having a hydrophobic group and a polymer block having an anionic group. In the polymer (G), the number of anionic groups and the solubility in water are not necessarily specified by the acid value or the number of anionic groups at the time of designing the polymer. For example, even for polymers having the same acid value, those having a lower molecular weight tend to have higher solubility in water, and those having a higher molecular weight tend to have a lower solubility in water. Therefore, in the invention, the polymer (G) is specified by the solubility thereof in water.

The polymer (G) may be a homopolymer, but is preferably a copolymer. The polymer (G) may be a random polymer, a block polymer, or an alternating polymer, and is preferably a block polymer among these. In addition, the polymer may be a branched polymer, but is preferably a straight chain polymer.

In addition, the polymer (G) is preferably a vinyl polymer from the viewpoint of the degree of freedom in design. As a method for producing a vinyl polymer having a molecular weight and solubility characteristics desired in the invention, preferable is a production method using "living polymerization" such as living radical polymerization, living cationic polymerization, and living anion polymerization.

Among these, the polymer (G) is preferably a vinyl polymer produced using a (meth)acrylate monomer as one of raw materials. As a method for producing such a vinyl polymer, living radical polymerization and living anion polymerization are preferred, and living anion polymerization is more preferred from the viewpoint that the molecular weight of the block polymer and each segment can be more precisely designed.

The polymer (G) produced by living anion polymerization is specifically a polymer represented by a general formula (3).

[Chem. 2]

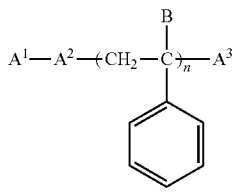

(3)

In the general formula (3), $A^1$ represents an organic lithium initiator residue, $A^2$ represents a polymer block of a monomer having an aromatic ring or a heterocyclic ring, $A^3$ represents a polymer block having an anionic group, n represents an integer of 1 to 5, and B represents an aromatic group or an alkyl group.

In the general formula (3), $A^1$ represents an organic lithium initiator residue. Specific examples of the organic lithium initiator include an alkyl lithium such as methyl lithium, ethyl lithium, propyl lithium, butyl lithium (n-butyl lithium, sec-butyl lithium, iso-butyl lithium, tert-butyl lithium, and the like), pentyl lithium, hexyl lithium, methoxymethyl lithium, and ethoxymethyl lithium; a phenylalkylene lithium such as benzyl lithium, α-methylstyryl lithium, 1,1-diphenyl-3-methylpentyl lithium, 1,1-diphenylhexyl lithium, and phenylethyl lithium; an alkenyl lithium such as vinyl lithium, allyl lithium, propenyl lithium, and butenyl lithium; an alkynyl lithium such as ethynyl lithium, butynyl lithium, pentynyl lithium, and hexynyl lithium; an aryl lithium such as phenyl lithium and naphthyl lithium; a heterocyclic lithium such as 2-thienyl lithium, 4-pyridyl lithium, and 2-quinolyl lithium; and an alkyl lithium magnesium complex such as tri (n-butyl) magnesium lithium and trimethyl magnesium lithium.

In the organic lithium initiator, a bond between an organic group and lithium is cleaved to generate an active terminal on an organic group side, and polymerization is started therefrom. Accordingly, an organic group derived from organic lithium is bonded to a terminal of the obtained polymer. In the invention, the organic group derived from organic lithium and bonded to the terminal of the polymer is referred to as the organic lithium initiator residue. For example, in a case of a polymer using methyl lithium as an initiator, the organic lithium initiator acid group is a methyl group, and in a case of a polymer using butyl lithium as an initiator, the organic lithium initiator acid group is a butyl group.

In the general formula (3), $A^2$ represents a polymer block having a hydrophobic group. In addition to a purpose of balancing appropriate solubility as described above, $A^2$ is preferably a group that is highly adsorbed to the pigment upon contact with the pigment, and from this viewpoint, $A^2$ is preferably a polymer block of a monomer having an aromatic ring or a heterocyclic ring.

Specifically, the polymer block of a monomer having an aromatic ring or a heterocyclic ring is a polymer block of a homopolymer or a copolymer obtained by homopolymerizing or copolymerizing a monomer having an aromatic ring such as a styrene-based monomer or a monomer having a heterocyclic ring such as a vinylpyridine-based monomer.

Examples of the monomer having an aromatic ring include a styrene-based monomer such as styrene, p-tert-butyldimethylsiloxystyrene, o-methylstyrene, p-methylstyrene, p-tert-butylstyrene, p-tert-butoxystyrene, m-tert-butoxystyrene, p-tert-(1-ethoxymethyl) styrene, m-chlorostyrene, p-chlorostyrene, p-fluorostyrene, α-methylstyrene, and p-methyl-α-methylstyrene; vinyl naphthalene; and vinyl anthracene.

In addition, examples of the monomer having a heterocyclic ring include a vinyl pyridine-based monomer such as 2-vinylpyridine and 4-vinylpyridine. These monomers may be used alone or as a mixture of two or more thereof.

In the general formula (3), $A^3$ represents a polymer block having an anionic group. The purpose of $A^3$ is to impart appropriate solubility as described above, and also to impart dispersion stability in water when a pigment dispersion is formed.

Examples of the anionic group in the polymer block $A^3$ include a carboxyl group, a sulfonic acid group, and a phosphoric acid group. Among these, a carboxyl group is preferred because of easy availability of preparation and abundance of monomer varieties. Two carboxyl groups may be dehydrated and condensed into an acid anhydride group within a molecule or between molecules.

A method for introducing the anionic group of $A^3$ is not particularly limited, and for example, when the anionic group is a carboxyl group, the polymer block $A^3$ may be a polymer block (PB1) of a homopolymer or a copolymer obtained by homopolymerizing (meth)acrylic acid or copolymerizing (meth)acrylic acid with another monomer, or may be a polymer block (PB2) of a homopolymer or a copolymer obtained by homopolymerizing a (meth)acrylate having a protective group capable of being regenerated as an anionic group by deprotection or copolymerizing the (meth) acrylate having such a protective group with another monomer, in which a part or all of protective groups capable of being regenerated as anionic groups are regenerated as anionic groups.

The (meth)acrylic acid used in the polymer block $A^3$ is a generic term for acrylic acid and methacrylic acid, and the (meth)acrylate is a generic term for acrylate and methacrylate.

Specific examples of the (meth)acrylic acid and the (meth)acrylate include (meth)acrylic acid, methyl (meth) acrylate, ethyl (meth)acrylate, iso-propyl (meth)acrylate, allyl (meth)acrylate, n-butyl (meth)acrylate, iso-butyl (meth)acrylate, sec-butyl (meth)acrylate, tert-butyl (meth) acrylate, n-amyl (meth)acrylate, iso-amyl (meth)acrylate, n-hexyl (meth)acrylate, n-octyl (meth)acrylate, 2-ethylhexyl (meth)acrylate, n-lauryl (meth)acrylate, n-tridecyl (meth) acrylate, n-stearyl (meth)acrylate, phenyl (meth)acrylate, benzyl (meth)acrylate, cyclohexyl (meth)acrylate, 4-tert-butylcyclohexyl (meth)acrylate, isobornyl (meth)acrylate, tricyclodecanyl (meth)acrylate, dicyclopentadienyl (meth) acrylate, adamantyl (meth)acrylate, glycidyl (meth)acrylate, tetrahydrofurfuryl (meth)acrylate, 2-methoxyethyl (meth) acrylate, 2-ethoxyethyl (meth)acrylate, dimethylaminoethyl (meth)acrylate, diethylaminoethyl (meth)acrylate, trifluoroethyl (meth)acrylate, tetrafluoropropyl (meth)acrylate, pentafluoropropyl (meth)acrylate, octafluoropentyl (meth)acrylate, pentadecafluorooctyl (meth)acrylate, heptadecafluorodecyl (meth)acrylate, N,N-dimethyl (meth) acrylamide, (meth)acryloyl morpholine, (meth)acrylonitrile, and polyalkylene oxide group-containing (meth)acrylates such as polyethylene glycol (meth)acrylate, polypropylene glycol (meth)acrylate, polyethylene glycol-polypropylene glycol (meth)acrylate, polyethylene glycol-polybutylene glycol (meth)acrylate, polypropylene glycol-polybutylene glycol (meth)acrylate, methoxypolyethylene glycol (meth) acrylate, ethoxypolyethylene glycol (meth)acrylate, butoxypolyethylene glycol (meth)acrylate, octoxypolyethylene glycol (meth)acrylate, lauroxypolyethylene glycol (meth) acrylate, stearoxypolyethylene glycol (meth)acrylate, phenoxypolyethylene glycol (meth)acrylate, methoxypolypropylene glycol (meth)acrylate, and octoxypolyethylene glycol-polypropylene glycol (meth)acrylate. These monomers may be used alone or as a mixture of two or more thereof.

In the living anion polymerization method, when the monomer to be used is a monomer that has a group having active protons such as an anionic group, an active terminal of a living anion polymerization polymer immediately reacts with the group having active protons to be deactivated, and thus a polymer cannot be obtained. In the living anion polymerization, it is difficult to polymerize the monomer that has a group having active protons as it is, and therefore, it is preferable to regenerate the group having active protons by polymerizing the monomer in a state where the group having active protons is protected and then deprotecting the protective group.

For this reason, in the polymer block $A^3$, it is preferable to use a monomer that contains a (meth)acrylate having a protective group capable of being regenerated into an anionic group by deprotection. By using the monomer, it is possible to prevent the above-described inhibition of polymerization during polymerization. The anionic group protected by the protective group can be regenerated into an anionic group by deprotection after obtaining the block polymer.

For example, when the anionic group is a carboxyl group, the carboxyl group can be regenerated by esterifying the carboxyl group and deprotecting the esterified carboxyl group by hydrolysis or the like in a subsequent step. In this case, the protective group that can be converted into a carboxyl group is preferably a group having an ester bond, and examples thereof include: a primary alkoxycarbonyl group such as a methoxycarbonyl group, an ethoxycarbonyl group, an n-propoxycarbonyl group, and an n-butoxycarbonyl group; a secondary alkoxycarbonyl group such as an isopropoxycarbonyl group and a sec-butoxycarbonyl group; a tertiary alkoxycarbonyl group such as a t-butoxycarbonyl group; a phenylalkoxycarbonyl group such as a benzyloxycarbonyl group; and an alkoxyalkyl carbonyl group such as an ethoxyethylcarbonyl group.

When the anionic group is a carboxyl group, examples of the monomer that can be used include: an alkyl (meth) acrylate such as methyl (meth)acrylate, ethyl (meth)acrylate, n-propyl (meth)acrylate, isopropyl (meth)acrylate, n-butyl (meth)acrylate, sec-butyl (meth)acrylate, isobutyl (meth) acrylate, t-butyl (meth)acrylate, 2-ethylhexyl (meth)acrylate, decyl (meth)acrylate, undecyl (meth)acrylate, dodecyl (meth)acrylate (lauryl (meth)acrylate), tridecyl (meth)acrylate, pentadecyl (meth)acrylate, hexadecyl (meth)acrylate, heptadecyl (meth)acrylate, octadecyl (meth)acrylate (stearyl (meth)acrylate), nonadecyl (meth)acrylate, and icosanyl (meth)acrylate; a phenylalkylene (meth)acrylate such as benzyl (meth)acrylate; and an alkoxyalkyl (meth)acrylate such as ethoxyethyl (meth)acrylate. These (meth)acrylates may be used alone or in combination of two or more thereof. Among these (meth)acrylates, t-butyl (meth)acrylate and benzyl (meth)acrylate are preferably used because a conversion reaction to a carboxyl group is easy. In consideration of industrial availability, t-butyl (meth)acrylate is more preferred.

In the general formula (3), B represents an aromatic group or an alkyl group having 1 to 10 carbon atoms. In addition, n represents an integer of 1 to 5.

In the living anion polymerization method, when the (meth)acrylate monomer is directly polymerized at an active terminal of a strongly nucleophilic styrene-based polymer, the (meth)acrylate monomer cannot be polymerized due to a nucleophilic attack on carbonyl carbon. Therefore, in the case of polymerizing the (meth)acrylate monomer in $A^1$-$A^2$, a reaction modifier is used to adjust nucleophilicity, and then the (meth)acrylate monomer is polymerized. B in the general formula (3) is a group derived from the reaction modifier. Specific examples of the reaction modifier include diphenylethylene, α-methylstyrene, and p-methyl-α-methylstyrene.

The living anion polymerization method can be carried out by a batch method such as a method used in free radical polymerization in the related art by adjusting reaction conditions, and can also be a continuous polymerization method using a microreactor. In the microreactor, since miscibility of a polymerization initiator and a monomer is good, the reactions are started at the same time, the temperature is uniform, and the polymerization speed can be made uniform, so that a molecular weight distribution of the polymer to be produced can be narrowed. At the same time, since a growth terminal is stable, it is easy to produce a block copolymer in which both components of the blocks are not mixed. Since controllability of the reaction temperature is good, it is easy to prevent a side reaction.

A general method of the living anion polymerization using a microreactor will be described with reference to FIG. 1 which is a schematic view of the microreactor.

A first monomer and a polymerization initiator for initiating polymerization are respectively introduced from tube reactors P1 and P2 (7 and 8 in FIG. 1) into a T-shaped micromixer M1 (1 in FIG. 1) having a flow path capable of mixing a plurality of liquids, and the first monomer is subjected to living anion polymerization in the T-shaped micromixer M1 to form a first polymer (step 1).

Next, the obtained first polymer is moved to a T-shaped micromixer M2 (2 in FIG. 1), and in the T-shaped micromixer M2, a growth terminal of the obtained polymer is trapped by a reaction modifier introduced from a tube reactor P3 (9 in FIG. 1) to perform reaction regulation (step 2).

At this time, the number of n in the general formula (3) can be controlled based on the type and the amount of the reaction modifier used.

Next, the first polymer subjected to the reaction regulation in the T-shaped micromixer M2 is moved to a T-shaped micromixer M3 (3 in FIG. 1), and a second monomer introduced from a tube reactor P4 and the first polymer subjected to the reaction regulation are continuously subjected to living anion polymerization in the T-shaped micromixer M3 (step 3).

Thereafter, the reaction is quenched with a compound having active protons such as methanol to produce a block copolymer.

When the polymer (G) represented by the general formula (3) according to the invention is produced in the microreactor, a monomer having an aromatic ring or a heterocyclic ring is used as the first monomer, and the monomer is reacted with an organic lithium initiator as the initiator to obtain a polymer block of the monomer having an aromatic ring or a heterocyclic ring of $A^2$ (an organic group as the organic lithium initiator residue of $A^1$ is bonded to one terminal of the polymer block $A^2$).

Next, after reactivity of the growth terminal is adjusted using the reaction modifier, the monomer that contains (meth)acrylate having a protective group that can be regenerated into an anionic group is reacted as the second monomer to obtain a polymer block.

Thereafter, $A^3$, that is, the polymer block having an anionic group is obtained by regenerating the protective group into the anionic group by a deprotection reaction such as hydrolysis.

A method of regenerating an ester bond of a protective group capable of being regenerated into an anionic group to the anionic group by a deprotection reaction such as hydrolysis will be described in detail.

A hydrolysis reaction of the ester bond proceeds under acidic conditions or basic conditions, but the conditions are slightly different depending on the group having an ester bond. For example, when the group having an ester bond is a primary alkoxycarbonyl group such as a methoxycarbonyl group or a secondary alkoxycarbonyl group such as an isopropoxy carbonyl group, a carboxyl group can be obtained by performing hydrolysis under basic conditions. In this case, examples of the basic compound which provides the basic conditions include metal hydroxides such as sodium hydroxide and potassium hydroxide.

In addition, when the group having an ester bond is a tertiary alkoxycarbonyl group such as a t-butoxycarbonyl group, a carboxyl group can be obtained by performing hydrolysis under acidic conditions. At this time, examples of an acidic compound which provides the acidic conditions include mineral acids such as hydrochloric acid, sulfuric acid, and phosphoric acid; Brønsted acids such as trifluoroacetic acid; and Lewis acids such as trimethylsilyl triflate. Reaction conditions for hydrolysis of the t-butoxycarbonyl group under the acidic conditions are disclosed, for example, in "Chemical Society of Japan, Fifth Edition, Jikken Kagaku Koza 16, Synthesis of Organic Compounds IV".

Further, as a method for converting a t-butoxycarbonyl group into a carboxyl group, a method using a cation exchange resin instead of the above acid may be used. Examples of the cation exchange resin include resins having an acid group such as a carboxyl group (—COOH) or a sulfo group (—SO₃H) in the side chain of the polymer chain. Among these, a cation exchange resin having a sulfo group in the side chain thereof and exhibiting strong acidity is preferred because progress of the reaction can be accelerated. Examples of a commercially available product of the cation exchange resin that can be used in the invention include a strongly acidic cation exchange resin "Amberlite" manufactured by Organo Corporation. An amount of the cation exchange resin to be used is preferably in a range of 5 parts by mass to 200 parts by mass, and more preferably in a range of 10 parts by mass to 100 parts by mass with respect to 100 parts by mass of the polymer represented by the general formula (3), so as to be able to effectively hydrolyze the ester bond.

In addition, when the group having an ester bond is a phenylalkoxycarbonyl group such as a benzyoxycarbonyl group, the group having an ester bond can be converted into a carboxyl group by performing a hydrogenation reduction reaction. At this time, the phenylalkoxycarbonyl group can be more quantitatively regenerated into a carboxyl group by performing a reaction at room temperature in the presence of a palladium catalyst such as palladium acetate, and using hydrogen gas as a reducing agent, as the reaction conditions.

As described above, since the reaction conditions at the time of conversion to a carboxyl group are different depending on the type of the group having an ester bond, a polymer obtained by copolymerization using, for example, t-butyl (meth)acrylate and n-butyl (meth)acrylate as the raw material of $A^3$ has a t-butoxycarbonyl group and an n-butoxycarbonyl group. Here, under acidic conditions in which the t-butoxycarbonyl group is hydrolyzed, the n-butoxycarbonyl group is not hydrolyzed, so that only the t-butoxycarbonyl group can be selectively hydrolyzed to be deprotected and thus converted into a carboxyl group. Accordingly, an acid value of the hydrophilic block ($A^3$) can be adjusted by appropriately selecting a monomer that contains (meth) acrylate having a protective group that can be regenerated into an anionic group as the raw material monomer of $A^3$.

In addition, in the polymer (G) represented by the general formula (3), it is more advantageous to use a block copolymer in which the polymer block ($A^2$) and the polymer block ($A^3$) are regularly bonded together to have a certain length, rather than a random copolymer in which the polymer block ($A^2$) and the polymer block ($A^3$) are bonded together in a random arrangement, so as to improve the stability of an aqueous pigment dispersion in which the pigment is dispersed in water using the polymer (G). The aqueous pigment dispersion is a raw material used for producing an aqueous ink, and is a liquid in which the pigment is dispersed in water at a high concentration using the polymer (G). The molar ratio $A^2:A^3$ of the polymer block ($A^2$) to the polymer block ($A^3$) is preferably in a range of 100:10 to 100:500, and more preferably 100:10 to 100:450, so as to obtain an aqueous ink capable of maintaining good ejection stability required when the aqueous ink is ejected by, for example, an inkjet method, and capable of producing a printed material having further excellent color developability and the like.

In addition, in the polymer (G) represented by the general formula (3), the number of monomers having an aromatic ring or a heterocyclic ring constituting the polymer block ($A^3$) is preferably in a range of 5 to 40, more preferably in a range of 6 to 30, and most preferably in a range of 7 to 25. The number of anionic groups constituting the polymer block ($A^3$) is preferably in a range of 3 to 20, more preferably in a range of 4 to 17, and most preferably in a range of 5 to 15.

The molar ratio $A^2:A^3$ of the polymer block ($A^2$) to the polymer block ($A^3$) is preferably 100:7.5 to 100:400, when the molar ratio $A^2:A^3$ is expressed as the molar ratio of the number of moles of the aromatic ring or the heterocyclic ring constituting the polymer block ($A^2$) to the number of moles of the anionic group constituting the polymer block ($A^3$).

In addition, the acid value of the polymer (G) represented by the general formula (3) is preferably 40 mgKOH/g to 400 mgKOH/g, more preferably 40 mgKOH/g to 300 mgKOH/g, and even more preferably 40 mgKOH/g to 190 mgKOH/g, so as to obtain an aqueous ink capable of maintaining good ejection stability required when the aqueous ink is ejected by, for example, an inkjet method, and capable of producing a printed material having more excellent abrasion resistance and the like.

The acid value of the polymer in the invention is determined by the same acid value measuring method as the measuring method for the fine particles of the polymer (G).

In the aqueous ink according to the invention, the anionic group of the polymer (G) is preferably neutralized.

As the basic compound for neutralizing the anionic group of the polymer (G), any known and commonly used compounds can be used, and examples thereof include inorganic basic substances such as alkali metal hydroxides such as sodium hydroxide and potassium hydroxide, and organic basic compounds such as ammonia, triethylamine, and alkanolamine.

The neutralization amount of the polymer (G) present in the aqueous pigment dispersion does not need to be 100% neutralized with respect to the acid value of the polymer. Specifically, the polymer (G) is preferably neutralized such that the neutralization ratio is 20% to 200%, and more preferably 80% to 150%.

The aqueous ink according to the invention may contain other additives such as a wetting agent (drying inhibitor), a penetrant, a preservative, a viscosity regulator, a pH regulator, a chelating agent, a plasticizer, an antioxidant, and an ultraviolet absorber, as necessary, in addition to the components described above.

In addition, the wetting agent that can be used in the aqueous ink can be used for the purpose of preventing drying of the aqueous ink at the nozzle portion. The wetting agent is preferably used in a range of 1 mass % to 50 mass % with respect to the total amount of the aqueous ink.

The wetting agent is preferably a wetting agent that is compatible with water and has an effect of preventing blocking of the ejection port of the inkjet head. Examples of the wetting agent include ethylene glycol, diethylene glycol, triethylene glycol, polyethylene glycol having a molecular weight of 2,000 or less, dipropylene glycol, tripropylene glycol, isopropylene glycol, isobutylene glycol, 1,4-butanediol, 1,3-butanediol, 1,5-pentanediol, 1,6-hexanediol, meso-erythritol, and pentaerythritol.

Examples of the penetrant that can be used as the optional component include lower alcohols such as ethanol and isopropyl alcohol, ethylene oxide adducts of alkyl alcohols such as ethylene glycol hexyl ether and diethylene glycol butyl ether, and propylene oxide adducts of alkyl alcohols such as propylene glycol propyl ether. The content of the penetrant is preferably 3 mass % or less, and more preferably 1 mass % or less with respect to the total amount of the aqueous ink, and it is even more preferable to substantially contain no penetrant.

(Method for Producing Aqueous Ink)

The aqueous ink according to the invention can be produced by mixing, for example, the acetylene-based surfactant (A), the nonionic surfactant (B) other than the acetylene-based surfactant (A), the aqueous medium (C), and as necessary, optional components such as a binder resin, a compound having a urea bond, a coloring material, an organic solvent, and other additives.

When mixing, for example, a dispersing machine such as a bead mill, an ultrasonic homogenizer, a high-pressure homogenizer, a paint shaker, a ball mill, a roll mill, a sand mill, a sand grinder, a dyno mill, a dispermat, an SC mill, or a nanomizer can be used.

More specific examples of the method for producing the aqueous ink include a method in which the acetylene-based surfactant (A), the nonionic surfactant (B) other than the acetylene-based surfactant (A), the aqueous medium (C), and, as necessary, a binder resin, a compound having a urea bond, a coloring material, an organic solvent, and other additives are mixed together and stirred to produce the aqueous ink.

Examples of the method for producing an aqueous ink other than those described above include a method including steps of: <1> mixing a pigment dispersing agent such as the polymer (G), a coloring material such as the pigment, and, as necessary, a solvent or the like to produce a coloring material dispersion a containing the coloring material at a high concentration; <2> mixing the compound having a urea bond, the acetylene-based surfactant (A), the nonionic surfactant (B) other than the acetylene-based surfactant (A), the aqueous medium (C), and, as necessary, other additives to produce a composition b; <3> producing a composition c containing the binder resin, the aqueous medium (C), and the like; and <4> mixing the coloring material dispersion a, the composition b, and the composition c.

The aqueous ink obtained by the above method is preferably subjected to a centrifugal separation treatment or a filtration treatment as necessary so as to remove impurities mixed in the aqueous ink.

The pH of the aqueous ink according to the invention is preferably 7.0 or more, more preferably 7.5 or more, and even more preferably 8.0 or more, so as to improve storage stability, redispersibility, and ejection stability of the aqueous ink. An upper limit of the pH of the aqueous ink is preferably 11.0 or less, more preferably 10.5 or less, and even more preferably 10.0 or less, so as to prevent deterioration of a member (for example, an ink ejection port and an ink flow path) constituting a device for coating on ejection of the aqueous ink, and to reduce an influence of the aqueous ink adhering to a skin.

In the aqueous ink according to the invention obtained by the above method, the mass ratio of the solid content of the coloring material such as the pigment, the pigment dispersing resin, the binder resin, and the like is preferably 5 mass % or more and 20 mass % or less, more preferably 5 mass % or more and 15 mass % or less, and particularly preferably 5 mass % or more and 12 mass % or less with respect to the total amount of the aqueous ink, so as to prevent ejection failure of the aqueous ink which may occur due to drying of the aqueous ink in an ink ejection nozzle and to ensure good storage stability.

The aqueous ink according to the invention can be used in various printing devices, and can be used exclusively for an ink for inkjet recording.

As described above, the ink for inkjet recording preferably has a viscosity of 2 mPa·s to 20 mPa·s and a surface tension of 20 mN/m to 40 mN/m.

A lower limit of a viscosity at 32° C. of the ink for inkjet recording used is 2 mPa·s or more, preferably 3 mPa s or more, and more preferably 4 mPa·s or more. On the other hand, an upper limit of the viscosity at 32° C. of the ink for inkjet recording is preferably 20 mPa·s or less, more preferably 9 mPa·s or less, particularly preferably 8 mPa·s or less, and still more preferably 7 mPa·s or less.

Since the aqueous ink having a viscosity within the above range has a sufficient volume of liquid droplets ejected from the inkjet head, even when the distance from the surface (x) of an inkjet head having an ink ejection port to the position (y) at which the perpendicular line of the surface (x) intersects with the recording medium is 1 mm or more, it is possible to apparently reduce a deviation of a landing position on the recording medium caused by flight deflection, and to effectively prevent the occurrence of a streak on the printed material.

In addition, the aqueous ink having a viscosity within the above range is further excellent in storage stability and ejection stability of an aqueous ink, and thus can be suitably used for printing by, for example, an inkjet method.

The viscosity of the aqueous ink is measured under the following conditions using a conical flat plate type (cone-plate type) rotating viscometer corresponding to an E-type viscometer.

Measurement device: TVE-25 type viscometer (TVE-25 L manufactured by a company)
Calibration standard fluid: JS20
Measurement temperature: 32° C.
Rotation speed: 10 rpm to 100 rpm
Injection amount: 1200 µL In addition, the lower limit of the surface tension at 25° C. of the ink for inkjet recording according to the invention used is preferably 20 mN/m or more, more preferably 25 mN/m or more, and even more preferably 28 mN/m or more. On the other hand, an upper limit of the surface tension at 25° C. of the aqueous ink used is 40 mN/m or less, preferably 35 mN/m or less, and more preferably 32 mN/m or less.

The aqueous ink having a surface tension within the above range has good wettability of the ejected liquid droplets on the surface of the recording medium, and has sufficient wet-spreading after landing. As a result, even when the distance from the surface (x) of the inkjet head having the ink ejection port to the position (y) at which the perpendicular line of the surface (x) intersects with the recording medium is 1 mm or more, it is possible to apparently reduce the deviation of the landing position on the recording medium caused by the flight deflection of the ejection liquid droplet, and to effectively prevent the occurrence of a streak on the printed material.

The surface tension of the aqueous ink refers to a value measured under the following conditions using an automatic surface tensiometer to which a Wilhelmy method is applied. According to the Wilhelmy method, static surface tension and dynamic surface tension can be measured, and the surface tension of the aqueous ink referred to in the invention represents a value of static surface tension.

Measurement device: automatic surface tensiometer (CBVP-Z type, manufactured by Kyowa Interface Science Co., Ltd.)
Measurement temperature: 25° C.
Measuring element: platinum plate When printing is performed on the recording medium with the aqueous ink according to the invention by the inkjet recording method, there is a concern that the inkjet head and the recording medium may come into contact with each other in a case where the surface of the recording medium has an uneven shape or in a case where the recording medium is large in size and has distortion or warpage. As a method of avoiding the contact, it is preferable to use an inkjet recording device having a configuration in which the distance (gap) from the surface (x) of an inkjet head having an ink ejection port to the position (y) at which a perpendicular line of the surface (x) intersects with the recording medium is preferably 1 mm or more, more preferably 2 mm or more, and even more preferably 3 mm or more.

A lower limit of the distance from the surface (x) to the position (y) at which the perpendicular line assumed with respect to the surface (x) intersects with the recording medium is preferably 3 mm or more, and an upper limit of the distance is preferably 10 mm or less, and particularly preferably 5 mm or less so as to prevent the surface of the recording medium and the ink ejection port from coming into contact with each other, effectively prevent the ink ejection port from being damaged, and effectively prevent ink ejection failure due to deterioration of water repellency function which the ink ejection port often has even when the recording medium is large and is easily warped, and to produce a printed material having no streak even when the distance between the surface of the recording medium and the inkjet head is long.

(Recording Medium)

The aqueous ink according to the invention can be printed on a recording medium having excellent aqueous ink absorbability, such as copy paper (PPC paper) generally used in a copying machine, a recording medium having an aqueous ink absorbing layer, a non-absorbable recording medium having no aqueous ink absorbability, or a poorly-absorbable recording medium having low water absorbability for the aqueous ink. In particular, even when the aqueous ink according to the invention is printed on a non-absorbable or poorly-absorbable recording medium, it is possible to obtain a printed material excellent in settability, abrasion resistance, and water resistance.

As the poorly-absorbable recording medium, it is preferable to use a recording medium having a water absorption of 10 g/m$^2$ or less at a contact time of 100 ms between the recording medium and water in combination with the aqueous ink according to the invention, so as to obtain a printed material having more excellent abrasion resistance and water resistance.

The water absorption was determined by measuring a transfer amount of pure water at a contact time of 100 ms under conditions of 23° C. and a relative humidity of 50% using an automatic scanning absorptometer (KM500win, manufactured by Kumagai Riki Kogyo Co., Ltd.), and determining the transfer amount as the water absorption for 100 ms. The measurement conditions are shown below.

[Spiral Method]
Contact Time: 0.010 to 1.0 (sec)
Pitch: 7 (mm)
Length per sampling: 86.29 (degree)
Start Radius: 20 (mm)
End Radius: 60 (mm)
Min Contact Time: 10 (ms)
Max Contact Time: 1000 (ms)
Sampling Pattern: 50
Number of sampling points: 19
[Square Head]
Slit Span: 1 (mm)
Width: 5 (mm)

Examples of the recording medium having aqueous ink absorbability include plain paper, cloth, cardboard, and wood. Examples of the recording medium having an absorbing layer include paper dedicated to inkjet, and specific examples thereof include Pictorico PRO Photo Paper manufactured by Pictorico Co., Ltd.

As the poorly-absorbable recording medium having low water absorbability for the aqueous ink, a corrugated paperboard having a surface provided with a colored layer that hardly absorbs the solvent in an aqueous ink, coated paper, light-weight coated paper, finely coated paper, and art paper such as printing paper can be used. The poorly-absorbable recording medium is a medium in which a coating material is coated onto a surface of high-quality paper or neutral paper, mainly composed of cellulose and not subjected to a surface treatment, to provide a coating layer. Examples thereof include finely coated paper such as "OK Everlight Coat" manufactured by Oji Paper Co., Ltd. and "Aurora S" manufactured by Nippon Paper Industries Co., Ltd.; light-weight coated paper (A3) such as "OK coat L" manufactured by Oji Paper Co., Ltd., and "Aurora L" manufactured by Nippon Paper Industries Co., Ltd.; coated paper (A2, B2) such as "OK top coat+ (water absorption at basis weight of 104.7 g/m$^2$ and contact time of 100 ms: 4.9 g/m$^2$ (the following water absorption is the same))" manufactured by Oji Paper Co., Ltd., "Aurora coat" manufactured by Nippon Paper Industries Co., Ltd., and Finesse Gloss (manufactured by UPM Corporation, 115 g/m$^2$, water absorption: 3.1 g/m$^2$) and Finess Matt (115 g/m$^2$, water absorption: 4.4 g/m$^2$) manufactured by UPM Corporation; and art paper (A1) such as "OK KINFUJI+" manufactured by Oji Paper Co., Ltd. and "Tokuhishi Art" manufactured by Mitsubishi Paper Mills Ltd.

A plastic film can be used as the non-absorbable recording medium that does not absorb the aqueous ink. Examples of the plastic film include a polyester film formed of polyethylene terephthalate, polyethylene naphthalate, or the like, a polyolefin film formed of polyethylene, polypropylene, or the like, a polyamide-based film formed of nylon or the like, a polystyrene film, a polyvinyl alcohol film, a polyvinyl chloride film, a polycarbonate film, a polyacrylonitrile film, and a polylactic acid film. As the plastic film, it is preferable to use a polyester film, a polyolefin film, or a polyamide-based film, and it is more preferable to use a polyethylene terephthalate film, a polypropylene film, or a nylon film.

As the plastic film, a film coated with polyvinylidene chloride or the like for imparting barrier properties, or a film having a metal layer of aluminum or the like or a vapor deposition layer formed of a metal oxide of silica, alumina or the like may be used.

The plastic film may be an unstretched film, or may be stretched in a uniaxial or biaxial direction. A surface of the film may not be treated, but is preferably subjected to various treatments for improving adhesiveness, such as a corona discharge treatment, an ozone treatment, a low-temperature plasma treatment, a flame treatment, and a glow discharge treatment.

The film thickness of the plastic film is appropriately changed depending on the intended use, and for example, in a case of a soft packaging use, the film thickness is preferably 10 μm to 100 μm so as to provide flexibility, durability, and curl resistance. The film thickness is more preferably 10 μm to 30 μm. Specific examples thereof include PYLEN, ESPET (both registered trademarks) manufactured by Toyobo Co., Ltd.

Such a poorly-water-absorbable or non-water-absorbable recording medium has poor absorbability for the aqueous ink and is difficult to dry after landing on the recording medium, so that mottling is likely to occur, and as a result, clearness of the printed material may be reduced. In contrast, in the aqueous ink according to the invention, by combining the acetylene-based surfactant (A) and the nonionic surfactant (B), a good printed material without mottling on the recording medium can be obtained.

The aqueous ink according to the invention can be suitably used for printing on, among the above recording media, a corrugated paperboard formed mainly of a paper board that absorbs the solvent contained in the aqueous ink easily, a corrugated paperboard provided with a colored layer that hardly absorbs the solvent contained in the aqueous ink on the surface of the paper board, or the like.

As the corrugated paperboard, for example, a corrugated paperboard obtained by attaching a liner to one surface or both surfaces of a core formed in, for example, a wave shape can be used, and a single-sided corrugated paperboard, a double-sided corrugated paperboard, a double wall corrugated paperboard, a triple wall corrugated paperboard, or the like can be used.

Specifically, as to the corrugated paperboard, the aqueous ink can be suitably used for printing on a corrugated paperboard formed of a paperboard that easily absorbs the solvent contained in the aqueous ink, a corrugated paperboard in which a colored layer, a waterproof layer, or the like that does not easily absorbs the solvent contained in the aqueous ink is provided on the surface of the paperboard, or the like. In the aqueous ink according to the invention, even in the case of using a non-absorbable or poorly-absorbable recording medium such as a corrugated paperboard on which a colored layer, a waterproof layer, or the like that does not easily absorb the solvent in the aqueous ink is provided on the surface of the paperboard, the landed aqueous ink easily wet-spreads on the surface of the recording medium, and as a result, the occurrence of a streak on the printed material can be effectively prevented. In addition, in the ink according to the invention, even when a non-absorbable or poorly-absorbable recording medium such as the corrugated paperboard is used, uneven drying of the ink is less likely to occur, and a good printed material without mottling can be obtained.

In addition, in a case where the aqueous ink according to the invention is used for inkjet printing on the corrugated paperboard, even when the distance from the surface (x) having the ink ejection port to the position (y) at which the perpendicular line of the surface (x) intersects with the recording medium is 1 mm or more, the aqueous ink sufficiently wet-spreads after landing on the recording medium, so that the occurrence of a streak on the printed material can be effectively prevented. Further, the ink according to the invention can prevent drying and solidification over time at the nozzle portion, is less likely to cause flight deflection of the ejection liquid droplet or blocking of the ejection port, and can effectively prevent the occurrence of a streak on the printed material.

Among the corrugated paperboards, as the corrugated paperboard in which a colored layer, a waterproof layer, or the like is provided on the surface thereof, for example, a corrugated paperboard having a coated film formed by coating a coloring agent or a waterproofing agent to the surface of the corrugated paperboard formed of the paper board by, for example, a curtain coating method or a roll coating method can be used.

Examples of the colored layer include a colored layer having a whiteness of 70% or more.

As for a layer such as a colored layer or a waterproof layer provided on the corrugated paperboard, it is preferable that, at a contact time of 100 ms between water and a recording surface of a recording medium such as the corrugated paperboard, the recorded medium has a water absorption of 10 g/m$^2$ or less, so as to obtain a waterproof effect of the printed material.

EXAMPLES

Hereinafter, the invention will be described in more detail by way of Examples.

(Production Example 1: Method for Producing Aqueous Pigment Dispersion (K-1))

Into an intensive mixer (manufactured by Nippon Eirich Co., Ltd.), 100 g of carbon black #960 (manufactured by Mitsubishi Chemical Corporation) and 40 g of a styrene-acrylic acid resin X-1 (manufactured by Seiko PMC Corporation) were charged and mixed at a rotor peripheral speed of 2.9 m/s and a pan peripheral speed of 1 m/s. Next, 50 g of propylene glycol (PG, manufactured by Asahi Glass Co., Ltd.) and 13 g of a 34 mass % potassium hydroxide aqueous solution were added into the intensive mixer, and the mixture was kneaded at the same rotor peripheral speed and pan peripheral speed as described above for 2 hours.

Next, 464 g of ion exchange water was gradually added into the intensive mixer while continuing stirring by the intensive mixer to obtain an aqueous pigment dispersion (K-1) having a pigment concentration of 15 mass %.

Production Examples 2 and 3: Method for Producing Aqueous Pigment Dispersion

As a raw material and a blending ratio, a raw material and a blending ratio shown in Table 1 were employed, and aqueous pigment dispersions were obtained by the same production method as in Production Example 1.

In the table, abbreviations are as follows.
PB 15:3: Pigment Blue 15:3
PR 122: Pigment Red 122
PY 74: Pigment Yellow 74
(Method for Preparing Binder)

Synthesis Example 1

Into a four-necked flask equipped with a stirrer, a thermometer, a cooling tube, and a nitrogen inlet tube, 16 g of "Newcol 707SF" (nonionic emulsifier, manufactured by Nippon Nyukazai Co., Ltd.), 6.5 g of "Noigen TDS-200D" (nonionic surfactant, manufactured by DKS Co., Ltd.), and 220 g of ion exchange water were charged, the temperature was raised to 80° C. under a nitrogen stream, and then an aqueous solution prepared by dissolving 0.8 g of ammonium persulfate in 16 g of ion exchange water was added thereto.

Next, a mixed solution of 60 g of 2-ethylhexyl acrylate, 100 g of styrene, 27 g of methyl methacrylate, 3 g of acrylamide, and 6 g of methacrylic acid was added dropwise to the four-necked flask over 3 hours, reacted for 2 hours, cooled to 25° C., neutralized with 1.5 g of 28 mass % ammonia water, and added with ion exchange water to obtain an acrylic resin aqueous dispersion liquid (Z) having a glass transition temperature (Tg) of 35° C. and a volume average particle size of 50 nm. A solid content concentration of the acrylic resin dispersion liquid (Z) was 39 mass %.

(Preparation of Aqueous Ink)

Example 1: Method for Preparing Aqueous Ink

An aqueous ink (J1) was obtained by mixing 5 g of ethyleneurea, 2 g of Surfynol 104PG50 (acetylene-based surfactant, manufactured by EVONIK), 1.5 g of Emulgen 104P (polyoxyethylene alkyl ether, manufactured by Kao Corporation), 14 g of propylene glycol, 16 g of glycerin, 9 g of the acrylic resin aqueous dispersion liquid (Z), 0.2 g of triethanolamine, 0.1 g of ACTICIDE B-20 (preservative, manufactured by Thor Japan Co., Ltd.,), an aqueous pigment dispersion (C-1), and 24.2 g of ion exchange water.

Examples 2 to 20: Method for Preparing Aqueous Ink

Aqueous inks (J2) to (J20) were obtained in the same manner as in Example 1 except that the formulation of the aqueous ink was changed as shown in Tables 2 to 5.

TABLE 1

|  | Production Example 1 | Production Example 2 | Production Example 2 | Production Example 3 |
|---|---|---|---|---|
| Aqueous pigment dispersion | K-1 | C-1 | M-1 | Y-1 |
| Pigment | Carbon black #960 | PB 15:3 | PR 122 | PY 74 |
| Pigment (g) | 100 | 100 | 100 | 100 |
| Styrene-acrylic resin X-1 (g) | 40 | 30 | 20 | 30 |
| Water-soluble organic solvent | PG | PG | PG | PG |
| Water-soluble organic solvent (g) | 50.0 | 50.0 | 100.0 | 80.0 |
| 34 mass % potassium hydroxide aqueous solution (g) | 13.0 | 9.8 | 6.5 | 9.8 |
| Ion exchange water (g) | 464.0 | 477.2 | 440.5 | 447.2 |

Examples 21 to 22 and Comparative Examples 1 to 4: Method for Preparing Aqueous Ink Aqueous inks (J21) to (J22) and aqueous inks (H1) to (H4) were obtained in the same manner as in Example 1 except that the formulation of the aqueous ink was changed as shown in Table 6.

TABLE 2

|  |  | Example 1 | Example 2 | Example 3 | Example 4 | Example 5 |
|---|---|---|---|---|---|---|
|  | Ink | J1 | J2 | J3 | J4 | J5 |
| Aqueous pigment dispersion | K-1 (g) | 28 |  |  |  | 28 |
|  | C-1 (g) |  | 28 |  |  |  |
|  | M-1 (g) |  |  | 28 |  |  |
|  | Y-1 (g) |  |  |  | 28 |  |
| Acetylene-based surfactant (A) | Product name | SF420 | SF420 | SF420 | SF420 | SF420 |
|  | (g) | 1.35 | 1.5 | 1.1 | 1.35 | 1.35 |
|  | HLB | 4 | 4 | 4 | 4 | 4 |
|  | Product name | SF465 | SF465 |  | SF465 | SF465 |
|  | (g) | 0.5 | 0.5 |  | 0.5 | 0.5 |
|  | HLB | 13 | 13 |  | 13 | 13 |
| Nonionic surfactant (B) | Product name | Emulgen 102KG | Emulgen 102KG | Emulgen 102KG | Emulgen 102KG | Emulgen 103 |
|  | (g) | 0.25 | 0.25 | 0.25 | 0.25 | 0.25 |
|  | HLB | 6.3 | 6.3 | 6.3 | 6.3 | 8.1 |
| Aqueous medium (C) | PG (g) | 9 | 10.5 | 7 | 12 | 9 |
|  | GLY (g) | 16 | 16 | 21 | 16 | 16 |
| Compound having urea bond | Ethyleneurea (g) | 5 | 5 | 5 | 5 | 5 |
| Binder | JONCRYL PDX-7696 (g) | 12.5 | 12.5 | 10 | 11.3 | 12.5 |
| Additive | TEA (g) | 1 | 1 | 1 | 1 | 1 |
|  | B-20 (g) | 0.1 | 0.1 | 0.1 | 0.1 | 0.1 |
| Ion exchange water (g) |  | Remnant | Remnant | Remnant | Remnant | Remnant |
| Total (g) |  | 100 | 100 | 100 | 100 | 100 |

TABLE 3

|  |  | Example 6 | Example 7 | Example 8 | Example 9 | Example 10 |
|---|---|---|---|---|---|---|
|  | Ink | J6 | J7 | J8 | J9 | J10 |
| Aqueous pigment dispersion | K-1 (g) |  |  |  |  |  |
|  | C-1 (g) | 28 |  |  | 28 | 28 |
|  | M-1 (g) |  | 28 |  |  |  |
|  | Y-1 (g) |  |  | 28 |  |  |
| Acetylene-based surfactant (A) | Product name | SF420 | SF420 | SF420 | SF420 | SF420 |
|  | (g) | 1.5 | 1.1 | 1.35 | 1.5 | 1.5 |
|  | HLB | 4 | 4 | 4 | 4 | 4 |
|  | Product name | SF465 |  | SF465 | SF465 | SF465 |
|  | (g) | 0.5 |  | 0.5 | 0.5 | 0.5 |
|  | HLB | 13 |  | 13 | 13 | 13 |
| Nonionic surfactant (B) | Product name | Emulgen 103 | Emulgen 103 | Emulgen 103 | Emulgen 104P | Emulgen 105 |
|  | (g) | 0.25 | 0.25 | 0.25 | 0.25 | 0.25 |
|  | HLB | 8.1 | 8.1 | 8.1 | 9.6 | 9.7 |
| Aqueous medium (C) | PG (g) | 10.5 | 7 | 12 | 10.5 | 10.5 |
|  | GLY (g) | 16 | 21 | 16 | 16 | 16 |
| Compound having urea bond | Ethyleneurea (g) | 5 | 5 | 5 | 5 | 5 |
| Binder | JONCRYL PDX-7696 (g) | 12.5 | 10 | 11.3 | 12.5 | 12.5 |
| Additive | TEA (g) | 1 | 1 | 1 | 1 | 1 |
|  | B-20 (g) | 0.1 | 0.1 | 0.1 | 0.1 | 0.1 |
| Ion exchange water (g) |  | Remnant | Remnant | Remnant | Remnant | Remnant |
| Total (g) |  | 100 | 100 | 100 | 100 | 100 |

TABLE 4

|  |  | Example 11 | Example 12 | Example 13 | Example 14 | Example 15 |
|---|---|---|---|---|---|---|
|  | Ink | J11 | J12 | J13 | J14 | J15 |
| Aqueous pigment dispersion | K-1 (g) |  |  |  |  |  |
|  | C-1 (g) | 28 | 28 | 28 | 28 | 28 |
|  | M-1 (g) |  |  |  |  |  |
|  | Y-1 (g) |  |  |  |  |  |
| Acetylene-based surfactant (A) | Product name | SF420 | SF423 | SF104 PG50 | SF104 PG50 | SF104 PG50 |
|  | (g) | 1.5 | 1.5 | 2 | 2 | 2 |
|  | HLB | 4 | 4 | 4 | 4 | 4 |
|  | Product name | SF465 | SF465 |  |  |  |
|  | (g) | 0.5 | 0.5 |  |  |  |
|  | HLB | 13 | 13 |  |  |  |
| Nonionic surfactant (B) | Product name | Emulgen 106 | Emulgen 108 | Emulgen 707 | Emulgen LS-106 | Emulgen MS-110 |
|  | (g) | 0.25 | 0.25 | 0.5 | 0.5 | 0.5 |
|  | HLB | 10.5 | 12.1 | 12.1 | 12.5 | 12.7 |
| Aqueous medium (C) | PG (g) | 10.5 | 10.5 | 10.5 | 10.5 | 10.5 |
|  | GLY (g) | 16 | 16 | 16 | 16 | 16 |
| Compound having urea bond | Ethyteneurea (g) | 5 | 5 | 5 | 5 | 5 |
| Binder | JONCRYL PDX-7696 (g) | 12.5 | 12.5 | 12.5 | 12.5 | 12.5 |
| Additive | TEA (g) | 1 | 1 | 1 | 1 | 1 |
|  | B-20 (g) | 0.1 | 0.1 | 0.1 | 0.1 | 0.1 |
|  | Ion exchange water (g) | Remnant | Remnant | Remnant | Remnant | Remnant |
|  | Total (g) | 100 | 100 | 100 | 100 | 100 |

TABLE 5

|  |  | Example 16 | Example 17 | Example 18 | Example 19 | Example 20 |
|---|---|---|---|---|---|---|
|  | Ink | J16 | J17 | J18 | J19 | J20 |
| Aqueous pigment dispersion | K-1 (g) |  |  |  |  |  |
|  | C-1 (g) | 28 | 28 | 28 | 28 | 28 |
|  | M-1 (g) |  |  |  |  |  |
|  | Y-1 (g) |  |  |  |  |  |
| Acetylene-based surfactant (A) | Product name | SF104 PG50 | SF104 PG50 | SF104 PG50 | SF104 PG50 | SF420 |
|  | (g) | 2 | 2 | 2 | 2 | 1.1 |
|  | HLB | 4 | 4 | 4 | 4 | 4 |
| Nonionic surfactant (B) | Product name | Emulgen A-60 | Emulgen B-66 | Emulgen 709 | Emulgen LS-110 | Emulgen 103 |
|  | (g) | 0.5 | 0.5 | 0.5 | 0.5 | 0.25 |
|  | HLB | 12.8 | 13.2 | 13.3 | 13.4 | 8.1 |
| Aqueous medium (C) | PG (g) | 10.5 | 10.5 | 10.5 | 10.5 | 7 |
|  | GLY (g) | 16 | 16 | 16 | 16 | 21 |
| Compound having urea bond | Ethyleneurea (g) | 5 | 5 | 5 | 5 | 5 |
| Binder | JONCRYL PDX-7696 (g) | 12.5 | 12.5 | 12.5 | 12.5 |  |
|  | Acrylic resin dispersion liquid (Z) |  |  |  |  | 9 |
| Additive | TEA (g) | 1 | 1 | 1 | 1 | 1 |
|  | B-20 (g) | 0.1 | 0.1 | 0.1 | 0.1 | 0.1 |
|  | Ion exchange water (g) | Remnant | Remnant | Remnant | Remnant | Remnant |
|  | Total (g) | 100 | 100 | 100 | 100 | 100 |

TABLE 6

|  |  | Comparative Example 1 | Comparative Example 2 | Example 21 | Example 22 | Comparative Example 3 | Comparative Example 4 |
|---|---|---|---|---|---|---|---|
|  | Ink | H1 | H2 | J21 | J22 | H3 | H4 |
| Aqueous pigment dispersion | K-1 (g) |  |  |  |  |  |  |
|  | C-1 (g) | 28 | 28 | 28 | 28 | 28 | 28 |
|  | M-1 (g) |  |  |  |  |  |  |
|  | Y-1 (g) |  |  |  |  |  |  |
| Acetylene-based surfactant (A) | Product name |  | SF420 | SF420 | Si 420 | SF420 | SF420 |
|  | (g) |  | 1.5 | 1.5 | 1.5 | 1.5 | 1.5 |
|  | HLB |  | 4 | 4 | 4 | 4 | 4 |

TABLE 6-continued

|  |  | Comparative Example 1 | Comparative Example 2 | Example 21 | Example 22 | Comparative Example 3 | Comparative Example 4 |
|---|---|---|---|---|---|---|---|
|  | Product name |  |  | SF465 | SF465 | SF465 | SF465 |
|  | (g) |  |  | 0.5 | 0.5 | 0.5 | 0.5 |
|  | HLB |  |  | 13 | 13 | 13 | 13 |
| Nonionic surfactant (B) | Product name | Emulgen 108 |  | Emulgen 108 | Emulgen 103 | Emulgen 1180 | Emulgen 109P |
|  | (g) | 1 |  | 1 | 1 | 0.25 | 0.25 |
|  | HLB | 12.1 |  | 12.1 | 8.1 | 13.5 | 13.6 |
| Aqueous medium (C) | PG (g) | 10.5 | 10.5 | 10.5 | 10.5 | 10.5 | 10.5 |
|  | GLY (g) | 16 | 16 | 16 | 16 | 16 | 16 |
|  | MMB (g) |  |  |  |  |  |  |
|  | MPD (g) |  |  |  |  |  |  |
| Compound having urea bond | Ethyteneurea (g) | 5 | 5 | 5 | 5 | 5 | 5 |
| Binder | Acrylic resin dispersion liquid (Z) | 9 | 9 | 9 |  | 9 | 9 |
|  | JONCRYL PDX-7696 (g) |  |  |  | 9 |  |  |
| Additive | TEA (g) | 1 | 1 | 1 | 1 | 1 | 1 |
|  | B-20 (g) | 0.1 | 0.1 | 0.1 | 0.1 | 0.1 | 0.1 |
| Ion exchange water (g) |  | Remnant | Remnant | Remnant | Remnant | Remnant | Remnant |
| Total (g) |  | 100 | 100 | 100 | 100 | 100 | 100 |

In the tables, abbreviations are as follows.
SF: Surfynol
PG: propylene glycol
GLY: glycerin
MMB: 3-methoxy-3-methyl butanol
MPD: 3-methyl-1,5-pentanediol
TEA: triethanolamine
B-20: ACTICIDE B-20 (preservative, manufactured by Thor Japan Co., Ltd.)
JONCRYL PDX-7696: acrylic resin aqueous dispersion liquid, manufactured by BASF Corporation (Evaluation of Aqueous Ink)

The aqueous inks (J1) to (J22) and (H1) to (H4) were evaluated by the following methods.

[Mottling]

An aqueous ink was coated onto an OK top coat+(basis weight: 157 g/m², manufactured by Oji Paper Co., Ltd.) using a bar coater No. 4, and naturally dried in an environment of 25° C. and 50% RH to obtain a coated film having a film thickness of 9 μm. An image obtained by reading the coated film with a scanner was subjected to numerical analysis using image analysis software "Image J". The image was binarized with 8 bits, and a value (solid image quality) serving as an index of a density difference of the image was calculated. An upper limit of the value of the solid image quality was 100, and it was determined that the closer the value was to 100, the better the coated film without mottling. The solid image quality was evaluated in five stages according to the value of the solid image quality.

5: solid image quality of 90 to 100
4: solid image quality of 75 or more and less than 90
3: solid image quality 50 or more and less than 75
2: solid image quality 40 or more and less than 50
1: solid image quality of less than 40

[Redispersibility]

An aqueous ink was coated onto a slide glass using a bar coater No. 2 to obtain a coated film having a film thickness of 4.5 μm. The slide glass coated with the ink was held on a hot plate heated to 35° C. for 30 minutes. The slide glass was immersed in pure water, and a degree of dissolution of the ink-coated film was visually evaluated in three stages.

3: the ink is completely dissolved, and the pure water is colored. No ink remains on the glass plate.

2: a part of the coated film is dissolved, and the pure water is slightly colored. A small amount of ink remains on the glass plate.

1: the ink does not peel off from the glass plate.

[Ejection Characteristics]

Inkjet heads KJ4B-YH manufactured by Kyocera Corporation were filled with the aqueous inks obtained in Examples and Comparative Examples, and a supply pressure was adjusted by setting a hydraulic head difference of an ink sub-tank from a head nozzle plate surface to +35 cm and a negative pressure to −5.0 kPa. The distance (gap) from the surface (x) of the inkjet head having the ink ejection port to the position (y) at which the perpendicular line assumed with respect to the surface (x) intersects with the recording medium was set to 2 mm. Coated paper "OK Top coat+ (157 g/m=) manufactured by Oji Paper Co., Ltd. was used as the printing paper.

After head maintenance, a solid image with a 100% printing density of 5 cm in length (conveying direction of printing paper) and 5 cm in width was printed to obtain a printed material 1. After a lapse of 5 minutes from the end of printing, a solid image with a 100% printing density was printed again on the same printing paper as described above without performing maintenance, thereby obtaining a printed material 2. Next, a vertical length of the solid image of the printed material 2 was measured. Next, a vertical length of the solid image of the printed material 1 was measured. The solid image of the printed material 2 having a vertical length shorter than the vertical length of the solid image of the printed material 1 by 0.5 cm or more was evaluated as "1", the solid image of the printed material 2 having a vertical length shorter than the vertical length of the solid image of the printed material 1 by 0.2 cm or more and less than 0.5 cm was evaluated as "2", and the solid image of the printed material 2 having a vertical length shorter than the vertical length of the solid image of the printed material 1 by 0 cm or more and less than 0.2 cm was evaluated as "3".

TABLE 7

|  | Example 1 | Example 2 | Example 3 | Example 4 | Example 5 |
|---|---|---|---|---|---|
| Aqueous ink | J1 | J2 | J3 | J4 | J5 |
| Mottling evaluation | 5 | 5 | 4 | 5 | 5 |
| Redispersibility | 3 | 3 | 3 | 3 | 3 |
| Ejection characteristics | 3 | 2 | 3 | 2 | 3 |

TABLE 8

|  | Example 6 | Example 7 | Example 8 | Example 9 | Example 10 |
|---|---|---|---|---|---|
| Aqueous ink | J6 | J7 | J8 | J9 | J10 |
| Mottling evaluation | 5 | 4 | 5 | 4 | 4 |
| Redispersibility | 3 | 3 | 3 | 3 | 3 |
| Ejection characteristics | 2 | 3 | 2 | 2 | 2 |

TABLE 9

|  | Example 11 | Example 12 | Example 13 | Example 14 | Example 15 |
|---|---|---|---|---|---|
| Aqueous ink | J11 | J12 | J13 | J14 | J15 |
| Mottling evaluation | 3 | 3 | 4 | 4 | 4 |
| Redispersibility | 3 | 3 | 2 | 2 | 2 |
| Ejection characteristics | 2 | 2 | 2 | 2 | 2 |

TABLE 10

|  | Example 16 | Example 17 | Example 18 | Example 19 | Example 20 |
|---|---|---|---|---|---|
| Aqueous ink | J16 | J17 | J18 | J19 | J20 |
| Mottling evaluation | 4 | 4 | 4 | 4 | 4 |
| Redispersibility | 2 | 2 | 2 | 2 | 3 |
| Ejection characteristics | 2 | 2 | 2 | 2 | 3 |

TABLE 11

|  | Comparative Example 1 | Comparative Example 2 | Example 21 | Example 22 | Comparative Example 3 | Comparative Example 4 |
|---|---|---|---|---|---|---|
| Aqueous ink | H1 | H2 | J21 | J22 | H3 | H4 |
| Mottling evaluation | 1 | 2 | 4 | 5 | 2 | 2 |
| Redispersibility | 1 | 1 | 1 | 1 | 3 | 3 |
| Ejection characteristics | 2 | 2 | 1 | 1 | 2 | 2 |

REFERENCE SIGNS LIST

1: T-Shaped micromixer M1
2: T-Shaped micromixer M2
3: T-Shaped micromixer M3
4: Tube reactor R1
5: Tube reactor R2
6: Tube reactor R3
7: Tube reactor P1 for pre-cooling
8: Tube reactor P2 for pre-cooling
9: Tube reactor P3 for pre-cooling
10: Tube reactor P4 for pre-cooling

The invention claimed is:

1. An aqueous ink, comprising:
an acetylene-based surfactant (A);
a nonionic surfactant (B) other than the acetylene-based surfactant (A); and
an aqueous medium (C), wherein
the acetylene-based surfactant (A) comprises a first acetylene-based surfactant having an HLB of 4 or less, and
the nonionic surfactant (B) has an HLB of less than 10 and is a polyoxyethylene alkyl ether or a polyoxyalkylene alkyl ether.

2. The aqueous ink according to claim 1, wherein
the acetylene-based surfactant (A) comprises the first acetylene-based surfactant having an HLB of between 3 to 4, and a second acetylene-based surfactant having an HLB of between 10 to 20.

3. The aqueous ink according to claim 1, wherein
a mass ratio of the acetylene-based surfactant (A) to the nonionic surfactant (B) [acetylene-based surfactant (A)/nonionic surfactant (B)] is in a range of 3 to 20.

4. The aqueous ink according to claim 1, further comprising: a compound having a urea bond.

5. The aqueous ink according to claim 1, further comprising:
an organic solvent, wherein the organic solvent contains propylene glycol (f1) and one or more organic solvents (f2) that are selected from the group consisting of glycerin, glycerin derivatives, diglycerin and diglycerin derivates.

6. An ink for inkjet recording, comprising:
the aqueous ink according to claim 1.

7. A printed material obtained by printing on a recording medium with the aqueous ink according to claim 1.

8. The printed material according to claim 7, wherein
the recording medium has a water absorption of 10 g/m$^2$ or less at a contact time of 100 ms between a recording surface of the recording medium and water.

9. A method for producing a printed material, comprising:
ejecting the aqueous ink according to claim 1 by an inkjet recording method in which a distance from a surface (x) of an inkjet head having an ink ejection port to a position (y) at which a perpendicular line of the surface (x) intersects with a recording medium is 1 mm or more; and
printing on the recording medium with the aqueous ink.

10. The aqueous ink according to claim 1, wherein the nonionic surfactant (B) is contained in an amount of 0.05% by mass to 0.5% by mass with respect to the total amount of the water-based ink.

* * * * *